US011905155B2

(12) United States Patent
Otto

(10) Patent No.: US 11,905,155 B2
(45) **Date of Patent: *Feb. 20, 2024**

(54) SCALABLE MODULAR SYSTEM AND METHOD FOR STORING, PRESERVING, MANAGING, AND SELECTIVELY DISPENSING BEVERAGES

(71) Applicant: Versabev, Inc., Wilmington, DE (US)

(72) Inventor: Harry Otto, Bronxville, NY (US)

(73) Assignee: Versabev, Inc., Wilmington, DE (US)

(*) Notice: Subject to any disclaimer, the term of this patent is extended or adjusted under 35 U.S.C. 154(b) by 153 days.

This patent is subject to a terminal disclaimer.

(21) Appl. No.: 17/093,567

(22) Filed: Nov. 9, 2020

(65) Prior Publication Data

US 2021/0070599 A1 Mar. 11, 2021

Related U.S. Application Data

(63) Continuation of application No. 14/183,647, filed on Feb. 24, 2014, now Pat. No. 10,870,565, which is a (Continued)

(51) Int. Cl.

| | |
|---|---|
| ***B67D 1/00*** | (2006.01) |
| ***B67D 1/04*** | (2006.01) |
| ***B67D 1/08*** | (2006.01) |

(52) U.S. Cl.

CPC ......... *B67D 1/0001* (2013.01); *B67D 1/0057* (2013.01); *B67D 1/0462* (2013.01); (Continued)

(58) Field of Classification Search

CPC .. B67D 1/0057; B67D 1/0462; B67D 1/0888; B67D 2001/0098; B67D 1/1252; (Continued)

(56) References Cited

U.S. PATENT DOCUMENTS

| | | | |
|---|---|---|---|
| 3,698,417 | A | 10/1972 | Smith |
| 3,756,459 | A | 9/1973 | Bannister |

(Continued)

FOREIGN PATENT DOCUMENTS

| | | | |
|---|---|---|---|
| CA | 2849116 | A1 | 4/2013 |
| CN | 1784354 | | 6/2006 |

(Continued)

OTHER PUBLICATIONS

European Patent Application No. 15751333.4, Examination Report dated Aug. 5, 2021.

(Continued)

*Primary Examiner* — Bob Zadeh
(74) *Attorney, Agent, or Firm* — Ahmann Kloke LLP

(57) ABSTRACT

A system for selectively dispensing a portion of liquid volume stored in pressurized environment comprising:

an incompressible, pressurized container including hollow housing and outer portion, pressurized container being airtight to maintain pressure level in an environment in housing portion, pressurized container including portal to access to housing portion and storage of compressible container;

a dispensing system including transport conduit extending from outer portion to housing portion, interface maintaining pressure level in environment, an end of transport conduit creating sealed connection to compressible container, another end coupled to dispenser, transport conduit including valve to enable or disable flow of liquid volume;

a carbonation component coupled to transport conduit to selectively add carbonation to flow according to blending profile;

a pressure regulation system connected to pressurized container and includes pressure conduit extending from outer portion into housing portion to compress compressible container; and a control system to selectively open and close valve.

18 Claims, 8 Drawing Sheets

Related U.S. Application Data continuation-in-part of application No. 14/055,876, filed on Dec. 20, 2013, now Pat. No. 9,242,845, which is a continuation-in-part of application No. 13/720,583, filed on Dec. 19, 2012, now abandoned, which is a continuation-in-part of application No. 13/329,282, filed on Dec. 18, 2011, now abandoned.

(60) Provisional application No. 61/931,560, filed on Jan. 24, 2014, provisional application No. 61/530,509, filed on Sep. 2, 2011.

(52) U.S. Cl.
CPC .... *B67D 1/0888* (2013.01); *B67D 2001/0098* (2013.01); *B67D 2210/00049* (2013.01); *B67D 2210/00062* (2013.01)

(58) Field of Classification Search
CPC ........ B67D 1/0001; B67D 2210/00049; B67D 2210/00062; A23L 2/54
See application file for complete search history.

(56) References Cited

U.S. PATENT DOCUMENTS

| | | | | |
|---|---|---|---|---|
| 3,933,282 | A | 1/1976 | Stevens, Jr. | |
| RE32,354 | E | 2/1987 | Savage | |
| 4,921,135 | A * | 5/1990 | Pleet | B67D 1/0869 222/105 |
| 4,997,108 | A | 3/1991 | Hata | |
| 5,011,700 | A * | 4/1991 | Gustafson | B67D 1/0462 261/DIG. 7 |
| 5,096,092 | A | 3/1992 | Devine | |
| 5,240,144 | A * | 8/1993 | Feldman | B67D 1/0462 222/105 |
| 5,251,787 | A | 10/1993 | Simson | |
| 5,499,758 | A | 3/1996 | McCann et al. | |
| 5,775,364 | A | 7/1998 | Erb | |
| 5,799,830 | A * | 9/1998 | Carroll | B67D 7/0255 222/530 |
| 6,109,301 | A | 8/2000 | Pfetzer | |
| 6,131,767 | A | 10/2000 | Savage | |
| 6,138,995 | A * | 10/2000 | Page | B67D 1/1252 261/DIG. 7 |
| 6,352,176 | B1 | 3/2002 | Hartsell | |
| 6,607,100 | B2 | 8/2003 | Phelps | |
| 6,669,051 | B1 | 12/2003 | Phallen et al. | |
| 6,799,085 | B1 * | 9/2004 | Crisp, III | G06Q 20/208 705/28 |
| 6,848,602 | B2 | 2/2005 | deCler | |
| 10,214,408 | B2 | 2/2019 | Istin | |
| 11,091,360 | B2 | 8/2021 | Christiansen | |
| 2003/0038145 | A1 * | 2/2003 | Arellano | B67D 1/0418 222/399 |
| 2003/0070555 | A1 | 4/2003 | Reyhanloo | |
| 2003/0098314 | A1 * | 5/2003 | Phelps | B67D 7/0266 222/1 |
| 2003/0102335 | A1 | 6/2003 | Barnett | |
| 2003/0205581 | A1 | 11/2003 | Wertenberger | |
| 2004/0245281 | A1 | 12/2004 | Oke | |
| 2005/0194399 | A1 * | 9/2005 | Proctor | B67D 1/0881 222/1 |
| 2005/0224523 | A1 | 10/2005 | O'Dougherty | |
| 2006/0175352 | A1 | 8/2006 | Emmendorfer | |
| 2006/0207997 | A1 | 9/2006 | Aguirre | |
| 2006/0283879 | A1 | 12/2006 | Rasmussen | |
| 2007/0187848 | A1 | 8/2007 | Sabadicci | |
| 2007/0204930 | A1 | 9/2007 | Phallen et al. | |
| 2007/0205219 | A1 | 9/2007 | Ziesel | |
| 2007/0284371 | A1 | 12/2007 | Anderson et al. | |
| 2008/0142115 | A1 | 6/2008 | Vogt et al. | |
| 2008/0163641 | A1 | 7/2008 | Mitchell | |
| 2008/0206429 | A1 | 8/2008 | Guerrero | |
| 2009/0069930 | A1 | 3/2009 | Peters | |
| 2009/0069931 | A1 | 3/2009 | Peters | |
| 2009/0069947 | A1 | 3/2009 | Newman | |
| 2009/0069949 | A1 | 3/2009 | Carpenter | |
| 2009/0157432 | A1 | 6/2009 | Palmroos | |
| 2009/0159612 | A1 * | 6/2009 | Beavis | A47J 31/40 222/145.5 |
| 2010/0006603 | A1 | 1/2010 | Weinberg | |
| 2010/0163572 | A1 * | 7/2010 | Downham | B67D 1/0867 222/145.6 |
| 2010/0276452 | A1 | 11/2010 | Vesborg | |
| 2011/0017776 | A1 * | 1/2011 | Metropulos | B67D 1/0041 222/129.1 |
| 2011/0054706 | A1 | 3/2011 | Murphy | |
| 2011/0316175 | A1 * | 12/2011 | Kumar | B01F 23/2362 261/DIG. 7 |
| 2013/0062366 | A1 * | 3/2013 | Tansey | B67D 1/0809 222/101 |
| 2014/0014687 | A1 | 1/2014 | Cornwell | |

FOREIGN PATENT DOCUMENTS

| | | |
|---|---|---|
| CN | 101010241 | 8/2007 |
| EP | 2154103 | 2/2010 |
| GB | 2146705 | 4/1985 |
| WO | 2011000021 | 1/2011 |
| WO | 2011061344 | 5/2011 |
| WO | 2012084166 | 6/2012 |
| WO | 2013042101 A1 | 3/2013 |

OTHER PUBLICATIONS

European Patent Application No. 15751333.4, Examination Report dated Sep. 26, 2019.

European Patent Application No. 15751333.4, Partial Search Report dated Nov. 9, 2017.

International Application No. PCT/US2015/017386, International Search Report and Written Opinion dated May 26, 2015.

European Patent application No. 22192238.8, Extended European Search Report dated Dec. 5, 2022, 14 Pages.

* cited by examiner

SCALABLE MODULAR SYSTEM AND METHOD FOR STORING, PRESERVING, MANAGING, AND SELECTIVELY DISPENSING BEVERAGES

The present patent application claims priority from, and is a continuation of U.S. patent application Ser. No. 14/183,647 entitled "SCALABLE MODULAR SYSTEM AND METHOD FOR STORING, PRESERVING, MANAGING, AND SELECTIVELY DISPENSING BEVERAGES," filed Feb. 24, 2014, which is a continuation in part of, the commonly assigned co-pending U.S. patent application Ser. No. 14/055,876 entitled "SYSTEM AND METHOD FOR STORING AND SELECTIVELY DISPENSING LIQUIDS," filed Dec. 20, 2013, now Issued as U.S. Pat. No. 9,242,845, which claims priority from, and is a continuation in part of, the commonly assigned U.S. patent application Ser. No. 13/720,583 entitled "SYSTEM AND METHOD FOR STORING AND SELECTIVELY DISPENSING LIQUIDS," filed Dec. 19, 2012, which claims priority from, and is a continuation in part of, the commonly assigned U.S. patent application Ser. No. 13/329,282 entitled "SYSTEM AND METHOD FOR INTERFACING WITH AND CONTROLLING, BEVERAGE DISPENSING CONTAINERS," filed Dec. 18, 2011, which claims priority from the commonly assigned U.S. Provisional Patent Application No. 61/530,509 entitled "SYSTEM AND METHOD FOR STORING AND SELECTIVELY DISPENSING LIQUIDS," filed Sep. 2, 2011. The present patent application also claims priority from, and is a non-provisional of, the commonly assigned U.S. Provisional Patent Application No. 61/931,560 entitled "SCALABLE MODULAR SYSTEM AND METHOD FOR STORING, PRESERVING, MANAGING, AND SELECTIVELY DISPENSING BEVERAGES," filed Jan. 24, 2014.

FIELD OF THE INVENTION

The present invention relates generally to systems and methods for storing and dispensing liquids, and more particularly to systems and methods for selectively dispensing liquids (such as wine or similar beverages) stored in a pressurized environment by utilizing a controlled source of pressure force to apply a sufficient pressure to the pressurized environment to dispense a portion of the stored liquid in accordance with a desired dispensing regime.

SUMMARY

The ever-increasing consumption of wine and similar beverages, both in various commercial establishments (e.g., restaurants, bars, lounges, etc.), and in consumers' homes, coupled with growth in consumer perception of wine as an "experience" meant to be paired with proper food or enjoyed though "tastings", has resulted not only in a growing consumer demand for a wider selection of wines made available in commercial establishments (leading to proliferation of dedicated "wine bar" establishments), but also fueled the desire of many consumers to be able to bring the "wine bar" or equivalent experience to their home.

While restaurants have traditionally relied on bottle purchases by their patrons, leaving only a few low-end wines available for "by the glass" pours from bottles that may remain in use for several days after being opened, due in large part to the inherent changes (e.g., oxidation) in wine over time when exposed to air, eventually leading to deterioration and spoilage. However, in view of the above-noted market trends, many establishments have been nevertheless forced to expand their "by-the-glass" (hereinafter "BTG") selections to meet consumer demand, but at a greatly increased cost (both due to rapid deterioration of unsealed wine bottles, and due to increased costs in labor in managing a wide-range of BTG pours). Stand-alone bars and lounges have traditionally offered limited wine selections, but in view of the aforementioned trends, they were likewise faced with the same obstacles as the restaurants. Finally, wine bars were forced to deal with the challenge of keeping a sufficiently wide ranging BTG selection by their very nature.

Virtually all attempted solutions to the above challenges involved devices and systems for preservation and/or dispensation of bottled wines, and thus were quite limited in their success due to inherent disadvantages of utilization of bottled wine in a commercial establishment environment. Moreover, due to the fact that virtually all bottle-based wine preservation systems are sized and configured only for use with standard 7 50 ml bottles which requires very frequent and time-consuming replacement of bottles when the establishment is busy (i.e., precisely at a time when the establishment staff is under the greatest pressure to maintain an appropriately high level of speedy service to the customers). Moreover, because higher-end conventional wine preservation/dispensing systems comprise a separate chamber for each bottle, the expense of systems that comprise a sufficient number of wine bottle chambers for larger establishments quickly rises into stratospheric levels.

To address the disadvantages of the use of bottled wine in commercial establishments, various companies proposed utilization of larger volume/less expensive "wine bags" (often offered in a "wine-in-bag"/"bag-in-box" format hereinafter "WinB products"). However, the previously known WinB products have different disadvantages when used in commercial establishments, which in some cases can make them less desirable than bottled wine under many circumstances. These disadvantages have resulted in at least the following key obstacles to wide-ranging successful use of WinB products in commercial and environments:

the difficulties in preserving and pouring wine from WinB product containers;

the amount of space taken up by WinB products and their containers—an especially serious issue for commercial environments where space is at a premium;

the challenge posed in commercial environments by the necessity of metering wine pours of specific volume from the WinB products, and the difficulty in tracking such pours automatically; and The aesthetic appearance of most WinB products and their containers does not permit their use in tastefully decorated commercial and consumer environments.

In view of the above, WinB products have only found very limited acceptance in all but a few smaller establishments. To date there has not been a suitable solution offered that would enable commercially practical use of wine-in-bag products in virtually all restaurant/bar (and similar) environments.

Fortunately, the commonly assigned co-pending U.S. patent application Ser. No. 14/055,876 entitled "SYSTEM AND METHOD FOR STORING AND SELECTIVELY DISPENSING LIQUIDS", which is hereby incorporated by reference herein in its entirety, has provided various embodiments of an advantageous inventive Pressurized Liquid Storage and Dispensing ("PLSMPD") system, that not only readily addresses and solves the drawbacks and disadvantages of all previously known wine and other liquid) preservation and dispensing solutions, but that also provides a number of heretofore unseen advantages, when utilized in connection with WinB products to dispense wine.

Specifically, in various exemplary embodiments thereof, the PLSMPD system of the '876 application is capable of transporting/dispensing wine locally, or to significantly remote dispensing locations, at extremely high speed and with a great deal of accuracy and precision, without spillage. Moreover, the '876 application PLSMPD system's rapid transport of the wine also subjects the wine to controlled oxygenation (which when properly administered, is widely considered to enhance the positive attributes of most wines). This highly desirable feature of the novel PLSMPD system is particularly advantageous in view of the fact that in many wine bars/fine dining establishments, quite a bit of tune is spent to "aerate" the wine prior to serving it-a process which would be rendered unnecessary if the inventive system is deployed.

Therefore, when used with WinB products, the rapid transport aspect of the '876 application PLSMPD system's is not only beneficial in terms of time savings for accurate pours, but also enhances the quality of the dispensed wine. In addition, in various embodiments thereof, the '876 application PLSMPD system is highly (and easily) configurable to ensure rapid highly accurate metered pours over a wide range of distances through the use of predefined pressure vs. time algorithms to automatically manage pour rate accuracy for one or more predetermined desired pour sizes.

However, the '876 application did, not specifically address the full range of special advantages and additional capabilities that are possible with the deployment of the novel PLSMPD system (or equivalent thereof) in a commercial establishment environment (such as a restaurant, bar, or equivalent, and/or in a hotel, cruise ship, or other hospitality environment).

It would thus be desirable to provide a system and method that resolves all of the disadvantages of previously known WinB products and their dispensing containers in their use in commercial environments. It would further be desirable to provide a system and method that offers heretofore unavailable advantageous features relating to preservation and controlled dispensing of beverages, such as wine, from WinB products or equivalents thereof. It would additionally be desirable to provide a system and method for preserved storage and selective controlled dispensation of beverages, such as wine, that is configurable for use with a variety of WinB products, and their equivalents, which is modular and readily scalable for advantageous utilization in environments ranging from consumer homes to large commercial/hospitality establishments.

BRIEF DESCRIPTION OF THE DRAWINGS

In the drawings, wherein like reference characters denote corresponding or similar elements throughout the various figures.

DETAILED DESCRIPTION OF PREFERRED EMBODIMENTS

Figure 1:
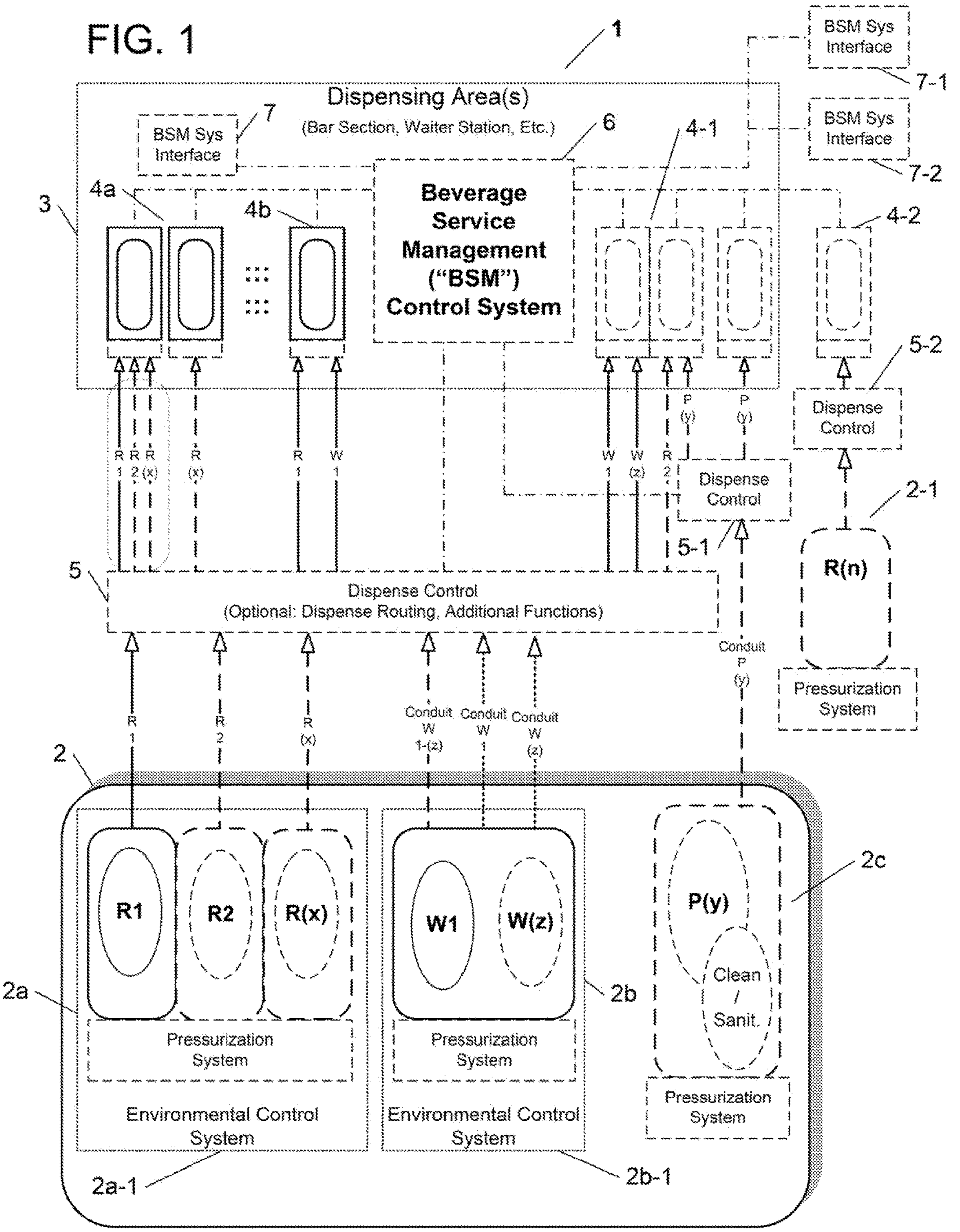
FIG. 1 is a diagram of a first exemplary embodiment of the inventive system and method for storing, preserving, managing, and selectively dispensing beverages, shown by way of example, as being deployed in a commercial environment.

The inventive system and method for storing, preserving, managing, and selectively dispensing beverages, in various embodiments thereof, remedies the flaws and drawbacks of all previously known wine storage and dispensing solutions (and especially larger-scale commercial solutions), regardless of their configuration, by storing a plurality of beverages (such as various wines, etc.) in a pressurized environment (which may be remotely located, and/or environmentally controlled) to ensure that the stored beverage does not come into contact with air, and then by selectively dispensing a portion of the stored beverage, in accordance with a desired configurable dispensing regime (which may be configured and controlled locally, remotely, and/or via a computerized system), by utilizing a controlled source of pressure force to apply a sufficient degree pressure to the pressurized environment to expel the desired volume of the beverage in a pressurized stream directed to a remote dispensing/pouring interface (for example located in a desired area of a bar, restaurant, or other hospitality establishment) through a liquid delivery system (which may comprise one or more separate systems, for example directed to different areas of a commercial establishment.

In at least one embodiment thereof, the system and method of the present invention are configured for use with compressible wine-in-bag ("WinB") product containers placed into at least one pressurized chamber (serving as the pressurized environment) and interfaced with a liquid delivery system connected one or more dispensing components (such as shown and described in various embodiments of the novel pressurization-based liquid dispensing technology disclosed in the above-incorporated '876 application as a Pressurized Liquid Storage and Dispensing system (which is hereby referred to as the "PLSMPD system"). Advantageously, the inventive system and method are scalable from use in conjunction with a single WinB product (for example, implemented with a simplified embodiment of the PLSMPD system, such as is shown in FIG. 2, and described in greater detail below in connection therewith), to deployment as a flexible multi-area electronically-controlled beverage dispensing infrastructure, operable to interface with various hospitality (e.g., restaurant) management systems (for example, implemented with one or more embodiments and optional features of a more robust PLSMPD system, such as is shown in FIG. 3A, and described in greater detail below in connection therewith).

At the outset, it should be noted that while the various descriptions of the different embodiments of the system and method of the present invention describe the utilization thereof with wine, it should be understood to one skilled in the art that the various embodiments of the inventive system and method can be readily utilized in conjunction with storage and selective dispensation of any beverage or liquid substance as a matter of design choice or necessity without departing from the spirit of the invention. Similarly, while the inventive system and method are described as being operable for use with WinB products, virtually any anaerobic compressible container can be readily substituted, or even integrated into the pressurized chamber (e.g., as a lining, etc.).

Figure 2:
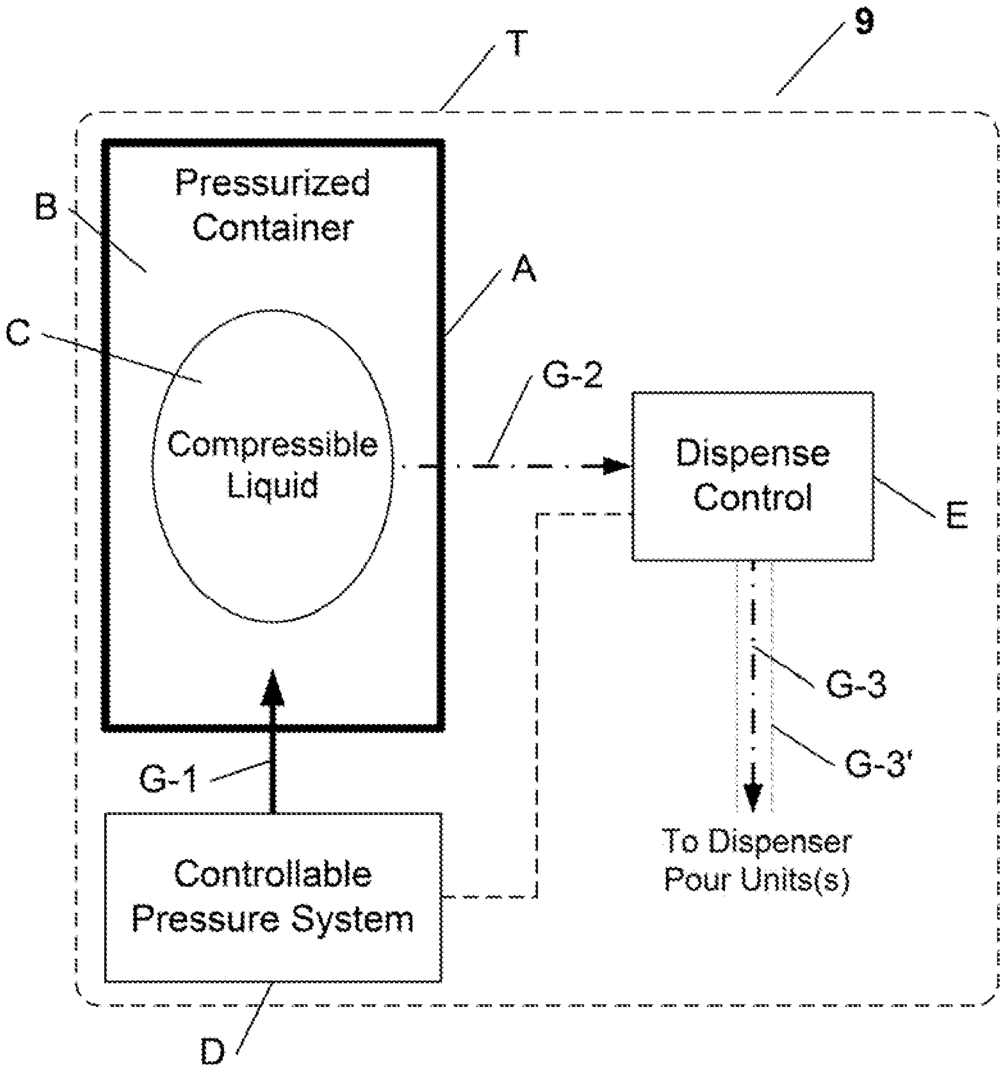
FIG. 2 is an illustrative diagram of a first exemplary embodiment of an inventive system and method for storing and selectively dispensing beverages, that may be advantageously utilized as a component of the inventive system and method for storing, preserving, managing, and selectively dispensing beverages of FIG. 1.
Figure 3A:
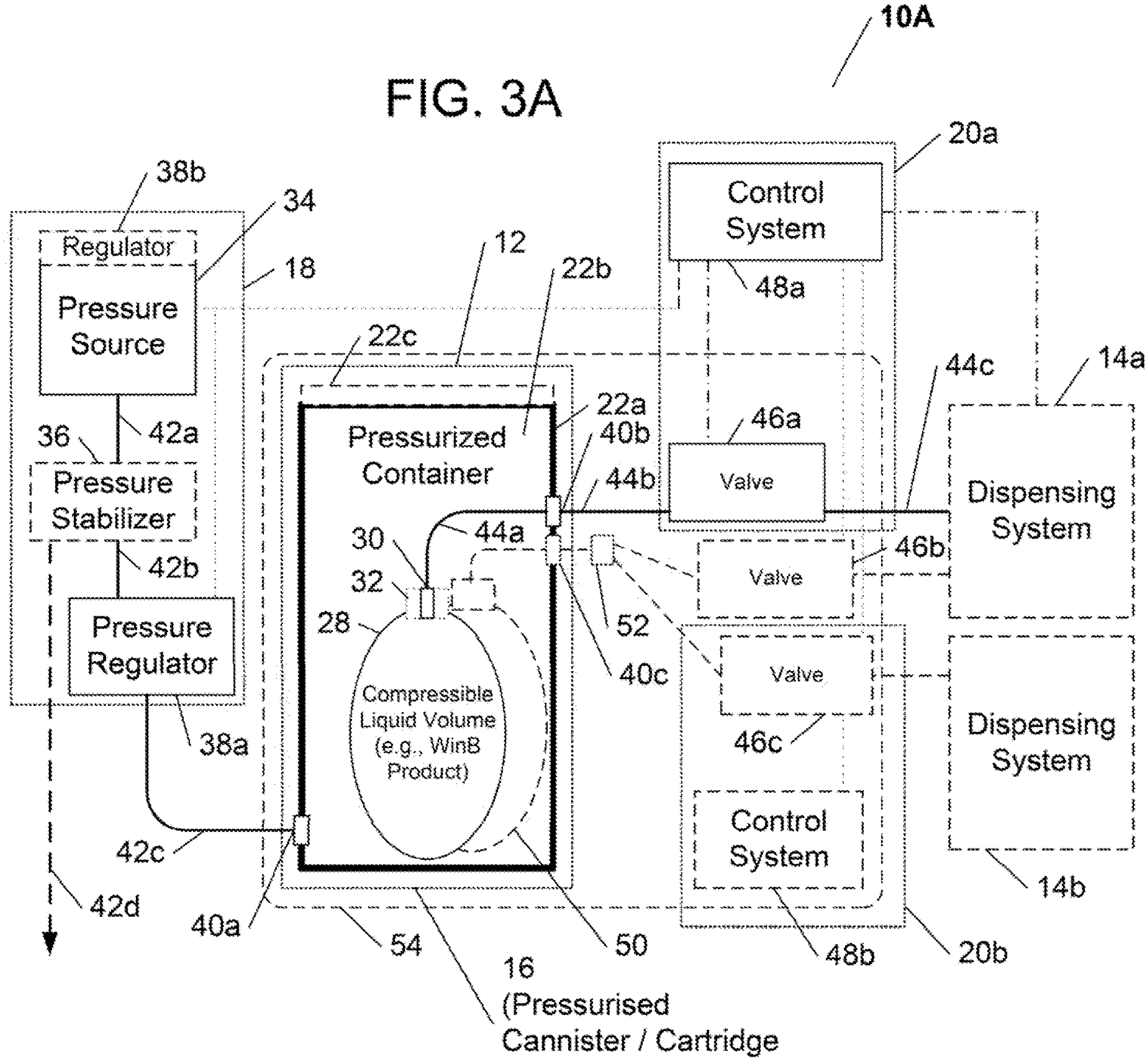
FIG. 3A is an illustrative diagram of a second exemplary embodiment of an inventive system and method for storing and selectively dispensing beverages, that may also be advantageously utilized as a component of the inventive system and method for storing, preserving, managing, and selectively dispensing beverages of FIG. 1.

Prior to describing the various embodiments of the system and method of the present invention in detail, it is helpful to provide an overview of various novel embodiments of a pressurization-based liquid metered pour dispensing technology disclosed in the above-incorporated '876 application as a "Pressurized Liquid Storage and Metered Pour Dispensing system" (which is hereby referred to as the "PLSMPD system") which are shown in FIGS. 2 and 3, and which are described in greater detail below in the section entitled "Exemplary Embodiments of the Pressurized Liquid Storage and Metered Pour Dispensing System for use with the Wine Cannon SPMMPD System of FIG. 1."

Referring now to FIG. 1 the inventive system and method for storing, preserving, managing, and selectively dispensing beverages, is shown as a storage, preservation, management, and metered pour dispensing ("SPMMPD") to system 1 (for the sake of convenience only, and not by way of any limitation, hereinafter referred to as the "Wine Cannon SPMMPD system 1"). It should be noted that the term "Wine Cannon" is used herein for ease of reference only, and does not in any way restrict or limit the various inventive system embodiments and components thereof.

The Wine Cannon SPMMPD system 1 is preferably configured for use with one or more pressurized storage/preservation ("PSP") systems that are each operable to store one or more WinB (or equivalent) products therein in a pressurized environment, and that are also operable to launch, in response to control signals, predetermined amounts of the stored wines to one or more remote dispenser pour units (as hereinafter described), through corresponding dispensing conduits, to enable each dispenser pour unit to rapidly serve precisely metered pours.

In various exemplary embodiments thereof, the Wine Cannon SPMMPD system 1 comprises at least a portion of the following components, elements, and/or features:

a. A plurality of dispenser pour units that are provided for connection to plural PSP systems, such that each dispenser pour unit can be connected to, and initiate dispensing from, one or more plural PSP systems, and/or from multiple beverages that may be available from any individual PSP system configured to dispense multiple beverages therefrom.
b. Plural PSP systems connected via dispensing conduits to various plural dispenser pour units, enable not just "perfect metered pours" (see below), but "serve" each pour to a corresponding dispenser pour unit, by utilizing a sudden rapid increase in pressure exerted on a selected compressible beverage volume stored therein, to eject each dispensed beverage from its volume and propelling it through the dispensing conduit to a corresponding dispenser pour unit (together forming a "sealed system"), with sufficient velocity to generate a vacuum effect and ensure that little, if any, of the poured beverage remains in the dispensing conduit after the you
c. Optionally, one or more dispensing conduits may comprise one or more check valves, with optional cooling of the portion of the dispensing conduit positioned between the PSP system and the check valve.
d. One or more of the plural PSP systems may be advantageously automated at a predetermined desired "automation level", ranging from a "lowest automation level" to a "highest automation level" (and which may be configured at any desired automation level therebetween):
    i. at the lowest "automation" level, the plural PSP systems may be controlled from the dispenser pour units (to initiate pours), and may provide minimum needed feedback such as alarms (e.g., wine running low or empty, pressurization problem(s), temperature variance in the system beverage storage component being outside safe range), without the need for use of a centralized control, system; and
    ii. at the highest "automation" level, the plural PSP systems may be controlled from a centralized control system (such as a BMS control system 6, described below), that may optionally still utilize local controls at the dispenser pour units to initiate pours, and/or utilize local PSP system control units) that can, in addition to providing a centralized alarm/system information "dashboard", also manage and automatically address various system issues (such as monitoring pour volumes and making automatic adjustments of pressure parameters in individual PSP systems to maintain predetermined "perfect metered pour" volumes, control temperature, automatically initiate and conduct cleaning processes (for example if dispensing system cleaning/sanitizing components and features are utilized), etc., in addition to performing various monitoring, reporting, and additional data processing functions (from monitoring beverage sales, inventory management, tracking beverage condition, and performing auto-reorders, to security/personnel management features tracking each pour by person who initiated it, and collecting and utilizing related data.

Advantageously, while the entire Wine Cannon SPMMPD system 1 ray be operated from local controls positioned at various locations where the beverages stores in the PSP systems are dispensed, preferably the Wine Cannon SPMMPD system may be controlled, configured, and operated, through a centralized Beverage Service Management ("BMS") control system 6 (for example comprising at least one data processing system (and related applicable components) operable to execute one or more configurable application programs and/or program modules).

The BMS control system 6, that may be readily configured for use with various embodiments of the system and method of the present invention may be a standalone system, or it may be integrated with an existing hospitality management system (for example in a large restaurant and/or in hotel or other sufficiently large venue facility), and while certain operations and back-office functions thereof are preferably restricted to a secure local or a secure web-accessible control interface, the day to day dispensing functions and related tasks may be operated (and optionally configured) from one or more control system interfaces (shown in FIG. 1 as BMS sys interfaces 7 to 7-2) which may comprise display equipped data processing systems (e.g., touch screen panels, computer stations, etc.) located at waiter stations, at a bar, etc.), and/or which may comprise conventional mobile data processing/communication devices (e.g., smart phones, tablets, etc.) supplied with appropriate software application programs ("Apps"), preferably comprising graphical user interfaces (GUIs).

In various exemplary embodiments thereof, the Beverage Service Management ("BMS") System—may comprise a centralized or a distributed data processing system with communication, data interchange, and data acquisition features, implemented as at least one of: a computer executing one or more application programs and having a (preferably) graphical user interface, a dedicated controller (or set of specialized controllers) for interfacing with and managing various components of the Wine Cannon SPMMPD system 1 (such as the plural PSP systems, the dispenser pour units, etc.), and/or as a hybrid platform in which a mobile data processing device (such as a smart phone or a tablet) may be utilized as the control and user interface, with the remainder of the functions being managed and implemented through one or more secondary data processing systems, and/or specialized controllers. Advantageously, the BMS control system 6 may comprise one or more of the following features/functions:

a. Providing operational monitoring, control and regulation functionality to all or part of the Wine Cannon SPMMPD system 1 and its components, ranging from monitoring each plural PSP system's parameters (such as pressurization (i.e. pressure level), temperature, etc.), to monitoring pour volume accuracy via one or more means at the dispenser pour units, or otherwise], and initiating adjustments in pressurization parameters to minimize pour volume variances; and also providing all necessary alarms and system information (preferably in a dashboard or equivalent format), to the applicable system administrator b. Providing information, reporting, and related system management functions, to automate, and reduce the cost of, Wine Cannon SPMMPD system 1 operations, such as:
   1. tracking individual beverage inventories and either provide re-order alerts, or automatically place re-orders when particular beverage inventories drop below specified levels),
   2. initiate automatic system Wine Cannon SPMMPD system 1 cleaning/sanitization,
   3. track Wine Cannon SPMMPD system 1 utilization through an enormous range of parameters, and provide very deep and broad reports on beverage sales by beverage, price level date, time of day, by personnel initiating the pours, by individual dispenser pour units, etc.), and
   4. when sufficient amounts of data is collected, provide beverage sales projections and related information b. Provide additional overall system features such as access management for individual dispenser pour units (via "token" type or Biometric ID verification, e.g., at the dispenser pour unit level), so that only specific authorized personnel may access the Units (with optional access levels so that a low level employee may be restricted from initiating pours of wines over $20 a glass), and tracking of the ID of each person initiating a pour along with all related information (pour tire, beverage poured, etc.);

c. Provide optional functionality to enable "extended" features, such as control and management of "self-service" stationary or mobile dispenser pour units, where individual customers can be pre-authenticated and pre-authorized to operate the self-service dispenser pour units (for example, biometrically or via being provided a "token" such as a magnetic, NFC, or RFID device) or an electronic token storable on their mobile device), enabling such pre-authorized customers to freely use self-service dispenser pour units, and, for example charge their pours to their room in a hotel or to a previously provided credit card, or to a pre-authorized "allowance" (for example during an event). Such authentication can also serve to verify the customers age.

d. In addition to application program-based inventory management functionality, providing optional physical inventory tracking features, including one or more of the following:
   1. Tracking and monitoring the acquisition, installation, and removal of each individual beverage container (e.g., wine-in-bag), through beverage container IDs (which may comprise labels (for example with scan able codes (barcodes, QR codes), with RFID tags (or equivalents), or through any other inventory tracking and management means; and/or
   2. Allocation of incoming inventory items (e.g., beverage containers) to their corresponding designated Dispensing Systems—for example incoming Pinot Nair and Chardonnay wine bags would be directed for installation in a specific Dispensing System equipped with blended pour and carbonation functionality and operable to dispense blended carbonated "champagne-style" pours.

Figure 3B:
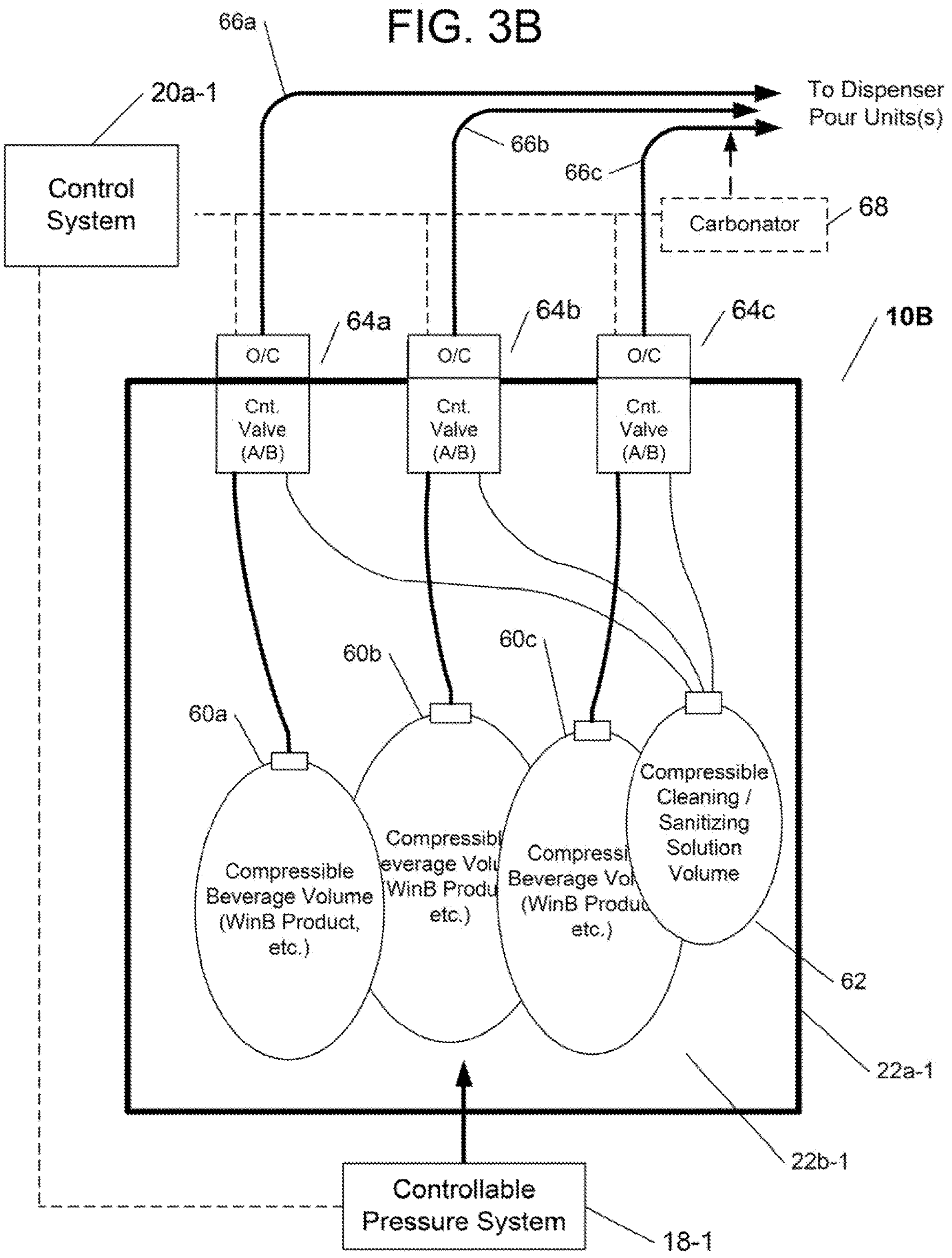
FIG. 3B is an illustrative diagram of a third exemplary embodiment of an inventive system and method for storing and selectively dispensing beverages, that may also be advantageously utilized as a component of the inventive system and method for storing, preserving, managing, and selectively dispensing beverages of FIG. 1.
Figure 3C:
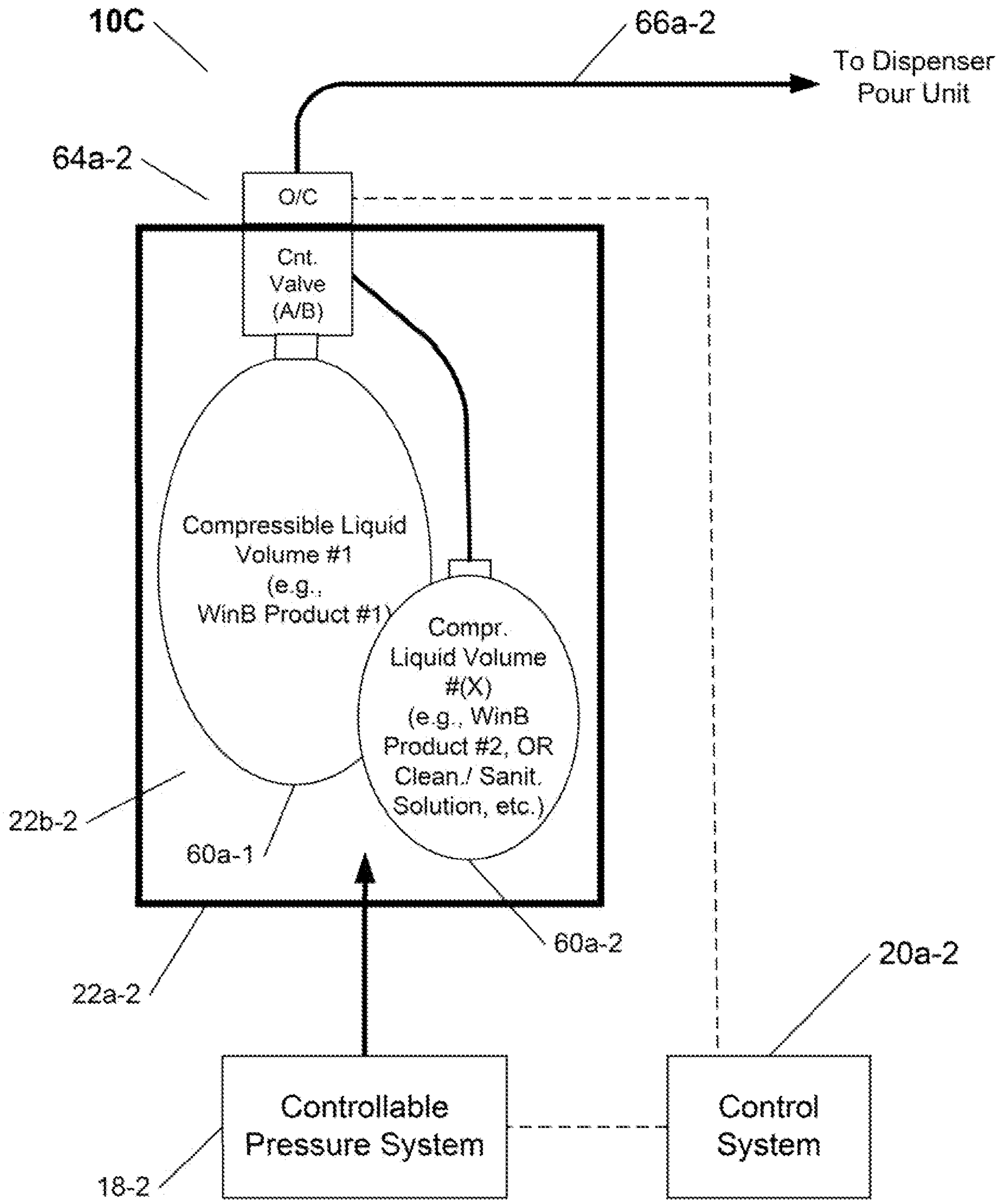
FIG. 3C is an illustrative diagram of a fourth exemplary embodiment of inventive system and method for storing and selectively dispensing beverages, that may also be advantageously utilized as a component of the inventive system and method for storing, preserving, managing, and selectively dispensing beverages of FIG. 1

In at least one embodiment of the present invention, each PSP system utilized in the Wine Cannon SPMMPD system 1, may comprise one or more of the following:

a. the pressurized container, pressurization system, and control elements (A-E, and G-1) of the PLSMPD system 9 of FIG. 2, b. one or more of the pressurized container, pressurization system, and control elements (12 and 16-52) of the PLSMPD system 10A of FIG. 3, c. one or more of the pressurized container, pressurization system, and control elements (18-1 to 22*a*-1 and 60*a* to 68) of the PLSMPD system 10B of FIG. 3B, and/or d. one or more of the pressurized container, pressurization system, and control elements (18-1 to 22*a*-1 and 60*a*-1 to 66*a*-2) of the PLSMPD system 10C of FIG. 3C.

Thus, for example, as described in greater detail below, each of the PSP systems 2*a*, 2*b*, or 2*c*, may comprise the pressurized container A coupled to a controllable pressure system D of the PLSMPD system 9 of FIG. 2, with, or without, the dispense control E, or it may comprise the pressurized canister/cartridge 16 coupled to the pressurization system 18 of the PLSMPD system 10A of FIG. 3A, with, or without, the control systems 20*a*, 20*b*, or it may comprise the PLSMPD system 10B of FIG. 3B, with, or without, the control system 20*a*-1, or it may comprise the PLSMPD system 10C of FIG. 3C, with, or without, the control system 20*a*-2.

Advantageously, by way of example, PSP systems may comprise and utilize compressible liquid volumes (such as WinB products) of a variety of different types, styles, varietals, and brands of beverages, such as different red wines R1-R(x), white wines W1-W(z), Ports or other cordials P(y), etc. Optionally, one or more of the PSP systems (such as PSP systems 2*a*, 2*b*) may be provided with temperature and/or other environmental (e.g., humidity) control systems (e.g. environmental control systems 2*a*-1, 2*b*-1) for proper maintenance of the stored beverages.

In accordance with the present invention, the Wine Cannon SPMMPD system 1 may comprise and utilize PSP systems of various configurations. Exemplary embodiments of PSP systems that may be advantageously utilized, may include, but are not limited to, at least one of the following PSP system exemplary embodiments:

a. A first embodiment of a novel PSP system (for example, PSP system 2*a*) comprising one or more pressurized containers each operable to store and launch (for dispensing) a single WinB product, through a corresponding dispensing conduit connected thereto (e.g., such as PLSMPD system 9 of FIG. 2);
   1. Optionally, each pressurized container may be configured as a cartridge (e.g., a canister/cartridge 16 of the PLSMPD system 10A of FIG. 3A), having various pressurized container interfaces positioned, sized and configured to align with and "plug in", or otherwise securely couple to corresponding pressurization source and liquid dispensing conduits when placed into a correspondingly configured "docking station" or equivalent (not shown).

For example, PSP system 2*a* may comprise a single pressurized container R1 with a single WinB product R1 positioned therein, or it may comprise a multiple pressurized containers R1-R(x), each comprising a single corresponding WinB product R1-R(x), b. A second embodiment of a novel PSP system (for example, PSP system 2*b* or 2*c*) comprising at least one pressurized container each operable to store multiple WinB products therein (each preferably having an identification/tracking element that enables personnel responsible for management thereof, to ensure that correct WinB products are positioned in correct PSP systems and connected to correct dispensing conduits (or dispensing conduit selection controllable valves), and:
   1. When the PSP system is configured with a plurality of outgoing dispensing conduits (one for each stored WinB product), launch each WinB product through a corresponding plural dispensing conduit connected thereto (e.g. such as WinB products 60*a*-60*c* being launched through corresponding individual dispensing conduits 66*a*-66*c* in PLSMPD system 10B of FIG. 3B), shown by way of example as PSP system 2*b* conduits W1 and W(z), or
   2. When the PSP system is configured with a single outgoing dispensing conduit (shared by all stored WinB products), launch each particular WinB product, selected from the plural WinB products being stored in the pressurized container, through the single shared dispensing conduit connected thereto (e.g., such as WinB products 60*a*-1 and 60*a*-2 being selectively (e.g., through a controllable solenoid valve) launched through a single dispensing conduit 66*a*-1 in PLSMPD system 10C of FIG. 3C), shown by way of example as alternate PSP system 2*b* conduit W1-(*z*), and c. An alternate embodiment, of the above-described second PSP system embodiment, in which one of the WinB products is replaced with a compressible liquid volume comprising a cleaning/sanitizing solution, that may be selectively "dispensed" through one or more corresponding dispensing conduits to clean and sanitize the conduit internals and the downstream dispenser pour units (e.g., such as compressible cleaning/sanitizing solution volume 62 in PLSMPD system 10B of FIG. 3B, or the compressible liquid volume 60*a*-2 in PLSMPD system 10C of FIG. 3C, when it is filled with a cleaning/sanitizing solution).

Optionally, rather than requiring the various PSP systems to utilize local pressure sources, the Wine Cannon SPMMPD system 1 may comprise a centralized stabilized pressure source (for example positioned in a remote location) connected to plural sealed outlets in a facility (such as an Events or Banquet hall or an exterior area), enabling portable and/or mobile PSP systems to be deployed proximally to such outlets without the need for portable pressure sources, so that when connected thereto, the PSP systems may share and utilize the centralized stabilized pressure source, and provide dispensing functionality through local dispenser pour units (which for example may be configured as simplified "guntype" pour components).

The Wine Cannon SPMMPD system 1 may be used with PSP systems located in a remote PSP area 2 (e.g., PSP systems, 2*a*, 2*b*, and optionally 2*c*), which is preferably a location that is environmentally appropriate for long term storage of wine and other beverages (such as a basement or a cellar), Optionally the Wine Cannon SPMMPD system 1 may also be used in conjunction with one or more locally positioned PSP systems, such as a PSP system 2-1.

The Wine Cannon SPMMPD system 1 also comprises a plurality of dispenser pour units 4*a*, 4*b*, and, optionally, 4-1 located in one or more dispensing areas 3, and optionally may also comprise at least one dispenser pour unit 4-2, located in a different area of the operating establishment. Each dispenser pour unit 4*a*-4-2 is operable to:

a. (Optionally) select a specific desired wine (or other beverage) from one or more available options, and
b. deliver the desired (selected) wine in a precisely metered pour (that may be optionally and selectively aerated, carbonated, and/or blended (from multiple selected wines), and/or otherwise pre-processed during the rapid dispensing process) in response to:
   1. manual actuation (e.g., by operating a local control manually (by a switch), by selection of a proper menu option at a BMS sys interface 7, 7-1, 7-2, etc., or
   2. automatic actuation, by target glass is positioned in a designated portion of the dispenser pour unit to receive a pour, of a pressure, light, or equivalent switch, or by other means, or
   3. a combination of manual and automatic actuation.

The dispenser pour units 4*a*, 4*b*, etc. may range from simple gun-type hand-operated dispensers positioned at the end of one or more liquid delivery conduits connected to the remote PSP systems, to a more robust and full-featured dispenser pour unit such as an exemplary embodiment of the novel dispenser pour unit configured for optimal use in connection with the Wine Cannon SPMMPD system 1, illustrated as a dispenser pour unit 100 in FIG. 4 along with various components thereof.

The delivery/dispense control/and optional routing of the various beverages R1-R(n), W1-W(z) and P(y) from the PSP systems 2*a*-2*c* in PSP area 2, and from other locations (e.g., from PSP system 2-1), to the various corresponding dispenser pour units 4*a* to 4-2, may optionally be accomplished by a dispense control system 5 (and optionally by one or more optional additional dispense control systems 5-1, 5-2) which may be configured to perform all necessary PSP system control functions (and thus eliminate the need for individual control local systems at each PSP system), and/or which may be configured to communicate with and selectively operate one or more control systems local to one or more corresponding PSP systems. Examples of configuration and operations of such systems are provided below, and are also set forth in connection with descriptions of dispense control E of the PSP system 9 of FIG. 2, and dispense controls 20*a*, 20*b* of the PSP system 10A of FIG. 3A.

Optionally, the dispense control system 5 may comprise one or more "enhancement" components, each operable to selectively apply one or more predefined enhancements to one or more dispensing conduits selectively connectable therewith. Examples of enhancement components that may be provided and utilized in accordance with the present invention include, but are not limited to:

a. A cooling component, operable to lower the temperature of the beverage in a dispensing conduit passing therethrough by a predefined amount, b. An aeration component, operable to selectively inject oxygen into a dispensing conduit to provide a desired level of aeration, and/or c. A carbonator component, operable to selectively add carbonation to any beverage being dispensed, thus providing an operating establishment with the option of selectively converting standard wine pours into sparkling wine pours (thereby enabling the operating establishment to create and offer Champagne-type pours from applicable varietals (e.g. pinot noir, chardonnay, etc.)), as well as to create Prosecco or Durello inspired pours, or carbonated pours of any other varietal (Shiraz, etc.).

1. Carbonation may be accomplished by injecting a carbonation medium (for example CO2 from a carbonation source, such as a CO2 tank connected to a PSP system dispensing conduit through a remotely controllable valve). Preferably, the BMS control system 6 is operable, directly or through the dispense control system or a local PSP system controller), to adjust carbonation pressure levels (and optionally other carbonation-related settings) in response to a control signal (which may be received either programmatically for a specific predefined "blended drink recipe"), or which may be selected from a BMS sys interface 7, 7-1, 7-2 (e.g., by a server or bartender), or, if such access is permitted, from a mobile device App.

2. Adjustment of other "carbonation-related" settings may include, for example, the option of adding a small amount of carbonic acid in the case the carbonated product is intended to be subsequently used in a mixer, as an ingredient in a mixed wine based drink (such as a Bellini). The addition of carbonic acid for such purposes would improve the end product, and permit the operating establishment to add more ice to the end product, increasing their per-product served revenue.

3. Carbonation functionality may be advantageously operable from a dispenser pour unit control interface, and/or from a BMS sys interface 7, 7-1, 7-2 (e.g., by a server or bartender), or, if such access is permitted, from a mobile device App.

4. In dispenser pour units having Blended Pour capability, the Carbonation function can be utilized in combination therewith, to produce blended carbonated pours in accordance with one or mere pre-configured Blended Carbonated Pour Profiles, or on an ad hoc basis.

Exemplary Embodiments of the Pressurized Liquid Storage and Metered Pour Dispensing System for Use with the Wine Cannon SPMMPD System of FIG. 1.

In summary, in a core (i.e., simplified) embodiment of the novel PLSMPD system, is that a liquid (e.g., wine) is stored in a pressurized environment under regulated pressure sufficient to maintain it in an anaerobic state (for example the liquid may be stored in a compressible bag disposed inside a sealed pressurized chamber), whereupon the liquid can be selectively dispensed through a normally locked dispensing conduit connected to its pressurized environment, while maintaining the anaerobic status of the remaining liquid, maintaining a predetermined level of pressure on the stored liquid, that is sufficient to expel the stored liquid in response to the dispensing conduit being selectively unlocked for as long as the conduit is open, in accordance with one or more predetermined dispensing profiles. Each such profile may comprise dispensing parameters that include, but that are not limited to, the volume of liquid to be dispensed, the distance the dispensed liquid will need to travel along the conduit to a dispensing system/interface to be poured, etc. In various embodiments thereof, the pressurization system component of the PLSMPD system compensates for the gradual decrease in the volume of the stored liquid such that system performance is maintained after multiple dispensations.

While a number of liquid transport solutions exist, attempting to apply them to address the above-noted challenges, of WinB product utilization, reveals their significant disadvantages that render such utilization impractical. For example, the majority of liquid transport system utilize mechanical pumps, with a separate pump being required for each liquid dispensing conduit (greatly increasing the cost of any implementation that requires delivery of multiple liquids (i.e., a selection of wines) to a remote dispensing target). Moreover, pumps generate heat during their operation, which has a significant negative impact on temperature-sensitive liquids (such as wines). Additionally, a mechanical pump requires that a liquid-filled bag (e.g., a WinB product) be placed in a holding vessel, with the nozzle positioned on the bottom of the bag, and because the mechanical pump does not pull the liquid (e.g., the wine) from its container (e.g., the bag), it can never fully empty the contents of the bag, resulting in ongoing losses of valuable products (and creating additional difficulties in depleted bag disposal. Furthermore, as dispensing WinB products is a very intermittent process, subjecting the pump to constant starts/stops greatly increases its wear/tear and leads to a sizable reduction in the pump's useful life.

Other liquid transport solutions eschew the use of mechanical pumps and instead rely on a "gravity feed" approach coupled with utilization of regulation flow-meters. However, because any liquid transport system based on such a solution will not be able to transport any liquid from its container to a dispensing location that is at the same level as, or elevated above, the portion of a bag from which the liquid exits. Moreover, the performance of any gravity feed solution suffers when the dispensing target, to which the liquid must be transported, is not positioned significantly below the bag from which the liquid is being dispensed.

Finally, both of the above-described previously known liquid transport solutions also suffer from one more common drawback. In the context of their utilization to dispense WinB products, it would be nearly impossible to configure either of the solutions to quickly deliver carefully metered pours on demand. Not only does this flaw increases costs due to over-dispensing expensive wines, but there are significant operational costs in commercial beverage service environments incurred when establishment staff must spend sufficient time to ensure an accurate pour.

The various embodiments of the novel PLSMPD system, that is preferable for use in conjunction with the inventive Wine Cannon SPMMPD system 1 of FIG. 1, not only readily address and solve the drawbacks and disadvantages of all previously known liquid transport solutions, but also provide a number of heretofore unseen advantages, particularly when utilized in connection with WinB products to dispense wine. Specifically, in various exemplary embodiments thereof, the PLSMPD system is capable of transporting/dispensing wine locally, or to significantly remote dispensing locations at extremely high speed and with a great deal of accuracy without spillage. Moreover, the novel systems rapid transport of the wine across a suitable distance also subjects the wine to controlled oxygenation (which when properly administered, is widely considered to enhance the positive attributes of most wines). This highly desirable feature of the PLSMPD system is particularly advantageous in view of the fact that in many wine bars/fine dining establishments, quite a bit of time and effort is spent to "aerate" the wine prior to serving it-a process which would be rendered unnecessary if the inventive system is deployed. Therefore, when used with WinB products, the rapid transport aspect of the PLSMPD system is not only beneficial in terms of time savings for accurate pours, but also enhances the quality of the dispensed wine.

In addition, the PLSMPD system is highly (and easily) configurable to ensure rapid highly accurate pours over a wide range of distances through the use of predefined pressure vs. time algorithms to automatically manage pour rate accuracy for one or more predetermined pour sizes. Control and tuning of such algorithms may be made at one or more of the following system components, as a matter of design choice without departing from the present invention:

a. locally at a PSP system (e.g. PSP systems 2*a*, 2*b*, 2*c* of FIG. 1),
b. at various dispense controls (e.g., at dispense controls 5, 5-1, 5-2 of FIG. 1),
c. at dispenser pour units (e.g., at dispenser pour units 4*a*, 4*b*, 4-1, 4-2, of FIG. 1), and
d. preferably, at the BMS control system 6, and/or at BMS sys interfaces 7, 7-1, 7-2 of FIG. 1)

Referring now to FIG. 2, a first exemplary embodiment of the inventive system and method for storing and selectively dispensing liquids that may be readily implemented in the Wine Cannon SPMMPD system of FIG. 1, is shown as a Pressurized Liquid Storage and Metered Pour Dispensing ("PLSMPD") system 9.

The PLSMPD system 9 includes a pressurized container A (e.g., an airtight high-pressure seal rated tank, vessel or equivalent) for storing a compressible liquid volume C (e.g., a flexible WinB product) within a pressurized environment B), a controllable pressure system D (e.g., a compressor, a compressed air (or other gas) tank, or an air pump connected to an air pressure stabilizer and an air pressure regulator) that is connected to the pressurized environment B through a pressure delivery conduit (e.g. tubing or piping) G-1. It should be noted that the controllable pressure system D may be readily selected from a variety of devices/systems operable to generate and maintain the pressurized environment B within the desired parameters. For example, the controllable pressure system D can utilize non-air gas, or another fluid. Alternately the pressure force for the controllable pressure system D, may be generated through gravity, preconfigured compressed air/gas container, or through other non-pumping means.

In an alternate embodiment of the present invention, the pressurized container A may be configured such that the compressible liquid volume C is implemented directly in the pressurized environment B, without being encased in a compressible flexible container. In this alternate configuration, a dispensing conduit G-2 (which may be plastic or metal tubing, or equivalent), would be directly connected to the pressurized container A (as opposed to being connected to the liquid volume C interface), while the controllable pressure system D would be selected and configured to provide direct pressurization to the compressible liquid volume C for example by volumetric compression of the internal region of the pressurized container A (e.g., by hydraulic/piston-like compression thereof) to generate and maintain the pressurized environment B within the necessary/desired parameters. The dispensing conduit G-2 may include one or more in-line 1-way check valves to minimize the amount of liquid that remains therein after each time the PLSMPD system 9 dispenses the liquid therethrough.

The PLSMPD system 9 also includes a local dispensing control system E (e.g., a solenoid valve coupled to a dispensing controller (which may range from a solid state electronic control to a computerized system operable to independently control multiple solenoid valves)), that is connected to the compressible liquid volume C via the conduit G-2. The local dispensing control system E is also connected to a corresponding dispenser pour unit (which may be one of the, via a dispensing conduit G-3 (which may likewise comprise plastic or metal tubing, or equivalent). Optionally, the dispensing conduit G-3 may be positioned within a hollow protective housing G-3', enabling the easy removal and replacement of dispensing conduit G-3 when needed.

Optionally, the local dispensing control system E may be connected to the controllable pressure system D, such that it may be operable to provide any necessary control functions, such as pressure maintenance/regulation, or, in an alternate embodiment of the present invention, when activated (for example, from the BMS control system 6 through a link therewith), the local dispensing control system E may instruct the controllable pressure system D to briefly increase the level of pressure in the pressurized environment B for all or a portion of the duration of a dispensing period to provide additional force and velocity to liquid being expelled from the liquid volume C (for example if a corresponding dispenser pour unit is particularly distant from the pressurized container A).

As noted above, the PLSMPD system 9 is operable through selective activation of the local dispensing control system E (through a remote signal from an external controller (e.g., the BMS control system 6)), and/or via an activation signal from a dispenser pour unit connected thereto (e.g., by a button, pressure, IR or equivalent switch).

In accordance with one or more predefined dispensing profiles, the local dispensing control system E opens the path therethrough for the conduit G-2, causing the pressurized liquid to be immediately expelled from the liquid volume C, through the local dispensing control system E and the conduit G-3 to be poured at the corresponding dispenser pour unit (e.g., such as dispenser pour unit 4*a*-4-2 of FIG. 1).

A dispensing profile may be as simple as a predetermined group of settings fully or partially locked into the PLSMPD system 9, that control pressurization, duration of the dispensing period, and other parameters. Or, in more sophisticated preferable implementations of the inventive PLSMPD system 9, a particular dispensing profile may be selectively is led from, and/or modified by, the BMS control system 6 (for example regulating the volume of each dispensed metered pour depending on a customer order, and/or that may provide instructions for additional operations).

For example, in accordance with such instructions, the dispensed wine can be diverted and then retrieved from (e.g., via an additional set of solenoid valves) a parallel wine aeration and/or accelerated aging system, prior to being poured. The implementation of deployment profiles in the inventive PLSMPD system 9 is preferably supported by at least one predefined pressure vs. time algorithm that may be executed by the local dispensing control system E to automatically manage pour rate accuracy for one or more predetermined pour sizes, at a corresponding dispenser pour unit. In one embodiment of the present invention, the remote controller may include a mobile device with corresponding software application comprising a graphical user interface, installed thereon.

In an alternate embodiment of the PLSMPD system 9, the pressurized container A (and optionally the conduits G-2, G-3, and the local dispensing control system E) may be positioned in a temperature controlled environment T that is suitable for temperature stable storage of the liquid being dispensed from the liquid volume C. The temperature controlled environment T may be passive (such as a cellar/basement), active (such as a refrigerated housing (or refrigerated jacketing or coils positioned around the pressurized container A), or a cold plate (or equivalent), or ice or equivalent freezable cold elements, positioned proximally to the pressurized container A (such under the bottom thereof), or a combination of one or more of the above (such as a climate controlled wine cellar). Additionally, a temperature control component may be positioned surrounding the liquid volume C (such as a cooling jacket around a wine bag).

In alternate embodiments of the present invention, the PLSMPD system 9 may be positioned on a mobile cart (not shown) or on an equivalent mobile platform, wherein the controllable pressure system D may comprise one or more air tanks, wherein the corresponding dispenser pour unit may comprise a dispensing gun (as described above), and wherein the dispensing control system may comprise a mobile device supplied with a corresponding user-controlled application.

Referring now to FIG. 3A, a second exemplary embodiment of the inventive system and method for storing and selectively dispensing liquids, is shown as a Pressurized Liquid Storage and Dispensing ("PLSMPD") system 10A. The PLSMPD system 10A, by way of example, illustrates multiple alternate embodiments of the PLSMPD system 9 of FIG. 1, highlighting the highly configurable and scalable properties of the system and method of the present invention (for example showing that the novel system can be readily utilized with multiple WinB products within a single pressurized container, and may comprise the capability of rapidly and accurately transporting the liquid from each stored compressible liquid volume to a common remote dispensing system, or to a plurality of proximal and/or dispersed dispensing systems. The PLSMPD system 10A, as described below in connection with FIG. 3A, also demonstrates its capability to employ a wide range of pressurization, liquid transport, and dispensing options, without departing from the spirit of the present invention.

The PLSMPD system 10A includes a pressurized container 22*a* (e.g., an airtight high-pressure seal rated tank, vessel or equivalent), for storing a compressible liquid volume 28 (e.g., a flexible WinB product) within a pressurized environment 22*b*. The compressible liquid volume 28 includes a volume interface 32 (e.g., a nozzle or equivalent) for accessing the liquid stored therein, preferably configured for a sealed/airtight connection to a releasable coupling 30 (such as a connector/compression filling), that in turn connects the compressible liquid volume 23 to a conduit 44*a*/44*b*.

In an alternate embodiment of the present invention, the pressurized container 22*a* may be configured as a pressurized canister/cartridge 16, having the various pressurized container interfaces 40*a*, 40*b* (and optionally 40*c*), positioned, sized and configured to align with and "plug in", or otherwise securely couple to corresponding pressurization and liquid delivery conduits when placed into a correspondingly configured "docking station" or equivalent (i.e., such as in connection with PSP systems 2*a*, 2*b*, and 2*c* of FIG. 2).

While the volume interface 32 and the releasable coupling 30 may be preconfigured to readily form a releasable sealed connection, in an alternate embodiment of the present invention, the releasable coupling 30 may comprise a "universal adapter" component, operable to enable the adaptive releasable coupling 30 to form a secure sealed (but releasable) connection with virtually any variation of the volume interface 32. Various embodiments of a novel adaptive releasable coupling that would be particularly advantageous for use as the adaptive releasable coupling 30, are described in greater detail in the commonly assigned U.S. patent application entitled "SYSTEM AND METHOD FOR INTERFACING WITH, AND CONTROLLING, BEVERAGE DISPENSING CONTAINERS", which is hereby incorporated by reference herein in its entirety. It should be noted that preferably the releasable coupling 30 also comprises a releasable sealed connector element operable to form a releasable connection with the conduit 44*a* so that it the conduit 44*a* can be readily disconnected if replacement or either component is necessary. In a preferred embodiment of the present invention, the sealed connector element of the releasable coupling 30 comprises a releasable adaptive pressurized filling that increases in strength and reliability in response to an increase in the pressure that is exerted in the PLSMPD system 10A (e.g., such as a pressurized "0-Ring" fitting).

Similarly, the use of such releasable adaptive pressurized fillings would be advantageous in all components of the PLSMPD system 10A in which connections with various conduits are made (in pressure container interfaces 40*a* and 40*b* (and in optional pressure container interface 40*c*), in an optional splitter 52 (e.g. a I-way diverter valve), and in numerous other connections (not specifically identified in FIG. 3A) involving the various pressurization conduits 42*a*, 42*b*, 42*c*, and 42*d*, and the various liquid transport conduits 44*a*, 44*b*, and 44*c*). Preferably, the pressure container interface 40*b* and the optional pressure container interface 40*c* comprise 1-way check valves (or combination control and 1-way check valves). While the liquid transport conduits

44*a*, 44*b*, and 44*c* may be of any sterile materials, preferably, they may be composed of flexible material that will enable the PLSMPD system 10A to take advantage of the "hammer effect" to increase the speed of the liquid being dispensed therethrough.

In accordance with the present invention, the various conduits utilized in connection with the PLSMPD system 10A comprise reliable, preferably flexible, tubing or equivalent, which may be composed from plastic (and related materials—e.g., polymers, etc.), or from suitable metal.

In some embodiments of the present invention, all conduits utilized in the PLSMPD system 10A may have uniform characteristics, whether employed for pressurization or for liquid transport functions (in which case when used for beverage dispensing, the conduits must be composed from non-reactive food-safe materials)—thus simplifying the PLSMPD system 10A maintenance and upkeep (i.e., since replacement conduits for either purpose may be readily cut and deployed as needed).

In other embodiments of the present invention, conduits utilized in the PLSMPD system 10A may have different characteristics, depending on whether they are employed for pressurization (e.g., conduits 42*a*, 42*b*, 42*c*, and 42*d*), or for liquid transport functions (e.g., conduits 44*a*, 44*b*, and 44*c*). In this case, the pressurization conduits do not need to be food-safe and may be more robust (such as through use of metal tubing), while the liquid transport conduits must be composed from non-reactive food-safe materials. Utilizing flexible materials for the liquid transport conduits 44*a*, 44*b*, and 44*c* enables the PLSMPD system 10A to take advantage of the "hammer effect" to increase the speed of the liquid being dispensed therethrough. Depending on their length, the liquid transport conduits 44*b* and 44*c* may also each include one or more corresponding controllable valves 46*a*, or 46*b*, 46*c*, respectively, which may be controllable 1-way valves, conventional 1-way check valves, or a combination thereof. Optionally, one or more diverter valves may be included in one or more of the liquid transport conduits 44*b* and 44*c* to minimize the amount of liquid that can remain therein following each time the PLSMPD system 10A dispenses the liquid.

Optionally, one or more additional compressible liquid volumes 50 may also be stored inside the pressurized container 22*a*, and also subjected to the pressurized environment 22*b* during PLSMPD system 10A operation. The size and quantity of such additional compressible liquid volume(s) 50 may be selected as a matter of design choice (e.g., based on the size of the selected pressurized container 22*a*, etc.) without departing from the spirit of the invention.

In an alternate embodiment of the present invention, one of the at least one additional compressible liquid volumes 50, may be filled with a cleaning solution operable for cleaning and sanitizing the liquid transport conduits 44*b*, and 44*c*, with the interface element 40*c* comprising a controllable 1-way diverter valve and being positioned in-line in conduit 44*a*, such that when activated (for example by the local control system 48*a*), the PLSMPD system 10A operation results in the cleaning solution from the compressible cleaning solution volume 50 passes through the same conduits, valves and related components as the main liquid being dispensed therethrough, thus ensuring that the PLSMPD system 10A remains clean and hygienic. The protocol for activation of the cleaning function can be configured and issued by the BMS control system 6, and can occur automatically in accordance with a predefined schedule, and/or automatically after a certain number of dispensing cycles, and can also be activated manually.

The pressurized container 22*a* preferably comprises an access component 22*c* (such as an airtight lid or other cover), that when opened, enables installation, removal, and/or replacement of the compressible liquid volume 28 (and/or of the additional compressible liquid volume(s) 50), and that when sealed, enables a controllable pressure system 8 to generate and maintain the desired pressurized environment 22*b* during PLSMPD system 10A operation.

The utilization of the controllable pressure system 18 by the PLSMPD system 10A, is one of the key aspects of the present invention, in that the controllable pressure system 18 is not only operable to manage the pressurized environment 22*b* in the pressurized container 22*a* within desired parameters (especially as the compressible liquid volumes are depleted during PLSMPD system 10A operation), but also because its operation supports the deployment and utilization of the above-described dispensing profiles by one or more dispensing systems (e.g., by a local control system 48*a* of a dispensing system 20*a*, and/or by an optional local control system 48*b* of an optional dispensing system 20*a*).

In at least one exemplary embodiment thereof, the controllable pressure system 18 includes a pressure source 34 (such as a compressor, an air pump, or equivalent thereof) connected, via pressurization conduit(s) 42*a*, 42*b*, to a pressure regulator 38*a*, that is operable to control the operation of the pressure source 34 to adjust the pressurized environment 22*b*, as needed, via a pressurization conduit 42*c* that forms a pressurized seal with the pressure container interface 40*a*. Seal (not check-valve bi-direction)

Preferably, after configuration of the desired settings and parameters thereof, the pressure regulator 38*a* operates automatically in accordance with its settings and parameters. In an alternate embodiment of the present invention, a pressure regulator 38*b* (having equivalent functionality to the pressure regulator 38*a*), or its features may be integrated into the pressure source 34, instead of using the pressure regulator 38*a* (or in addition thereto, for example for enabling backup/failsafe system operation, e.g., in case the pressure regulator 38*a* fails).

Preferably, the controllable pressure system 18 also includes a pressure stabilizer 36 positioned between pressurization conduits 42*a* and 42*b*, operable to "store" pressurization generated by the pressure source 34, and thereby to support the operation of the pressure regulator 38*a* by serving as an interim "on-demand" source of pressure for the pressure regulator 38*a* without needing to intermittently activate/engage the pressure source 34. Optionally, the pressure stabilizer 36 may serve as an interim pressure source for another pressure regulator of another PLSMPD system (not shown) via the pressurization conduit 42*d*, such that the other PLSMPD system may share the pressure source 34 and the pressure stabilizer 36 with the PLSMPD system 10A.

As was noted above, in connection with the description of the controllable pressure system D of FIG. 2, the controllable pressure system 18, and the various components thereof (34, 36, 38), may be readily selected from a variety of devices/systems operable to generate and maintain the pressurized environment 22*b* within the desired parameters. For example, the controllable pressure system 18 can utilize non air gas, or another fluid, such as compressed air and/or compressed $CO_2$ tanks. Alternately, the pressure force for the controllable pressure system 18 may be generated through gravity, via one or more preconfigured compressed air/gas container, or through other non-pumping means, and/or through introduction of $CO_2$ into the pressure regulator 38*a*.

The PLSMPD system 10A also includes the dispensing control system 20*a*, which may comprise:

(1) a controllable valve 46*a* (e.g., a solenoid or other electromechanical valve) coupled to the compressible liquid volume 28 via the liquid transport conduit 44*b*, the container interface 40*b*, and the liquid transport conduit 44*a* (preferably with a way check valve capability); and (2) an optional local control system 48*a*, that comprises:

(a) an electronic data processing system operable to execute program/control instructions (which may be implemented in virtually any configuration ranging from a solid state electronic controller, to a computerized system that is operable to independently control multiple electromechanical devices and to optionally interface with a more comprehensive liquid dispensing management system (for example, such as disclosed in the above-incorporated '491 application), (b) one or more suitable electromechanical control components operable, in response to the electronic data processing system, to control electromechanical valves (such as the controllable valve 46*a* (and optionally one or more additional controllable valve(s) 46*b*, 46*c* (e.g., if the optional additional compressible liquid volume 50 is employed))), and optionally to control other electromechanical devices (for example, such as one or more components of the controllable pressure system 18, a dispensing system 14*a*, etc.), and (c) optionally a remote controller component, which may include a mobile device with a corresponding software application comprising a graphical user interface, installed thereon.

The dispensing control system 20*a* is also connected to a dispensing system 14*a* via the liquid transport conduit 44*c*.

If one or more optional additional compressible liquid volume(s) 50 are employed, the PLSMPD system 10A may include one or more optional dispensing control system(s) 20*b*, having a local control system 48*b* and a controllable valve 46*c* (each of which may be provided in any of a variety of configurations described above in connection with the local control system 48*a*, and the controllable valve 46*a*). The optional dispensing control system 20*b* is connected to a dispensing system 14*b* (for example a dispenser pour unit of the Wine Cannon SPMMPD system 1), and is operable to dispense the liquid from the compressible liquid volume(s) 50 therethrough.

Optionally, one or more stand-alone controllable valve(s) 46*b* may be provided that are controllable by the dispensing control system 20*a* (and/or by the dispensing control system 20*b*, if present), without need for a dedicated control system therefor. As is shown in FIG. 3A by way of example, the stand-alone controllable valve 46*b* may be used in conjunction with the additional compressible liquid volume 50 and the optional splitter 52, to execute rapid metered pours from the compressible liquid volume 50 to the dispensing system 14*a*, while the dispensing control system 20*b* is operable to simultaneously execute rapid metered pours from the compressible liquid volume 50 to the dispensing system 14*b*. Optionally, the above functions can be implemented utilizing a Y-adapter manifold.

Optionally, the dispensing control system 20*a* (and/or of the dispensing control system 20*b*) may be connected to the controllable pressure system 18 (or to individual components thereof), such that it array be operable to provide any necessary control functions, such as pressure maintenance/regulation. In an alternate embodiment of the present invention, when activated (for example, from the dispensing system 14*a* through a link therewith), the dispensing control system 20*a* may instruct the controllable pressure system 18 to briefly increase the level of pressure in the pressurized environment 22*b* for all (or for a portion of the duration of a dispensing period) to provide additional force and velocity to liquid being expelled from the compressible liquid volume 28 (for example if the dispensing system 14*a* is particularly distant from the pressurized container 22*a*), thus temporarily modifying the predefined pressure vs. time algorithm(s).

In an alternate embodiment of the PLSMPD system 10A, the pressurized container 22*a* may be positioned in a temperature controlled environment 54 that is suitable for temperature stable storage of the liquid being dispensed from the compressible liquid volume 28 (and/or from the compressible liquid volume 50). The temperature controlled environment 54 may be passive (such as a cellar/basement), active (such as a refrigerated housing (or refrigerated jacketing or coils positioned around the pressurized container 22*a*), or a cold plate (or equivalent), or ice or equivalent freezable cold elements, positioned proximally to the pressurized container 22*a* (such under the bottom thereof), or a combination of one or ore of the above (such as a climate controlled wine cellar). Additionally, an individual temperature control component (such as a cooling jacket around a wine bag) may be positioned surrounding any liquid volume stored in the pressurized container 22*a* that requires lower temperatures for optimal storage (e.g. the liquid volume 28 and/or 50).

Other than as is noted above, the PLSMPD system 10A operates in a manner substantially similar as described above in connection with the PLSMPD system 9 of FIG. 2, with respect to its activation, the use of various dispensing profiles (e.g., one or both of the dispensing control systems 20*a*, 20*b* be utilize the same, overlapping or different dispensing profiles).

Referring now to FIG. 3B, a third exemplary embodiment of the inventive system and method for storing and selectively dispensing liquids, is shown as a Pressurized Liquid Storage and Dispensing ("PLSMPD") system 108. The PLSMPD system 10B, is a first alternate embodiment of the PLSMPD system 10A of FIG. 3A (comprising elements 18-1, 20*a*-1, 22*a*-1, and 22*b*-1, corresponding to their counterpart elements 18, 20*a*, 22*a*, and 22*b* shown in FIG. 3A), configured with a plurality of outgoing dispensing conduits (66*a*-66*c*) one for each stored compressible liquid volume (WinB product) 60*a*-60*c*), that is operable to launch each WinB product through a corresponding plural dispensing conduit connected thereto via a set of controllable AB Open/Close solenoids 64*a*-64*c*.

By way of example, the PLSMPD system 10B may comprise a system cleaning/sanitizing feature, implemented as a compressible cleaning/sanitizing solution volume 62 that can be utilized to clean any of the dispensing conduits 66*a*-66*c*, when the control system 20*a*-1 selectively activates each individual AB—Open/Close solenoid 64*a*-64*c*, one at a time, to dose off a corresponding stored to connect the compressible cleaning/sanitizing solution volume 62 to each corresponding dispensing conduit 66*a*-66*c*, and to perform cleaning/sanitization by running a cleaning cycle therethrough. At the conclusion of the cleaning process, the control system 20*a*-1 causes A/B—Open/Close solenoids 64*a*-64*c* to select the connections to the compressible liquid volumes (WinB product) 60*a*-60*c*).

Optionally, by way of example, a local carbonator component 68 operable through the control system 20*a*-1 (or remotely from the BMS control system 6) may be provided with selective connectivity to one or more of the dispensing conduits 66*a*-66*c*, having the functionality described above in connection with the dispense control system 5 of FIG. 1.

Referring now to FIG. 3C, a fourth exemplary embodiment of the inventive system and method for storing and selectively dispensing liquids, is shown as a Pressurized Liquid Storage and Dispensing ("PLSMPD") system 10C. The PLSMPD system 10C, is a first alternate embodiment of the PLSMPD system 10A of FIG. 3A (comprising elements 18-2, 20*a*-2, 22*a*-2, and 22*b*-2, corresponding to their counterpart elements 18, 20*a*, 22*a*, and 22*h* shown in FIG. 3A), configured with a single outgoing dispensing conduit 66*a*-2 that is selectively connectable to one of the two stored compressible liquid volumes 60*a*-1 and 60*a*-2, by operation of the A/B-Open/Close solenoid 64*a*-2 (to which the compressible liquid volumes 60*a*-1 and 60*a*-2 are connected), in response to corresponding control signal from the control system 20*a*-2 or from the BMS control system 6).

By way of example, the PLSMPD system 10C may comprise a system cleaning/sanitizing feature that can be utilized to dean the dispensing conduit 66*a*-2 if the compressible liquid volume 60*a*-2 comprises a cleaning/sanitizing solution. The cleaning feature may be activated when the control system 20*a*-2 selectively activates the A/B-Open/Close solenoid 64*a*-2 to connect the compressible cleaning/sanitizing solution volume 60*a*-2 to the dispensing conduit 66*a*-2, and to perform cleaning/sanitization by running a cleaning cycle therethrough. At the conclusion of the cleaning process, the control system 20*a*-2 causes A/B—Open/Close solenoid 64*a*-2 to select the connection to the compressible liquid volume 60*a*-2.

Figure 4A:
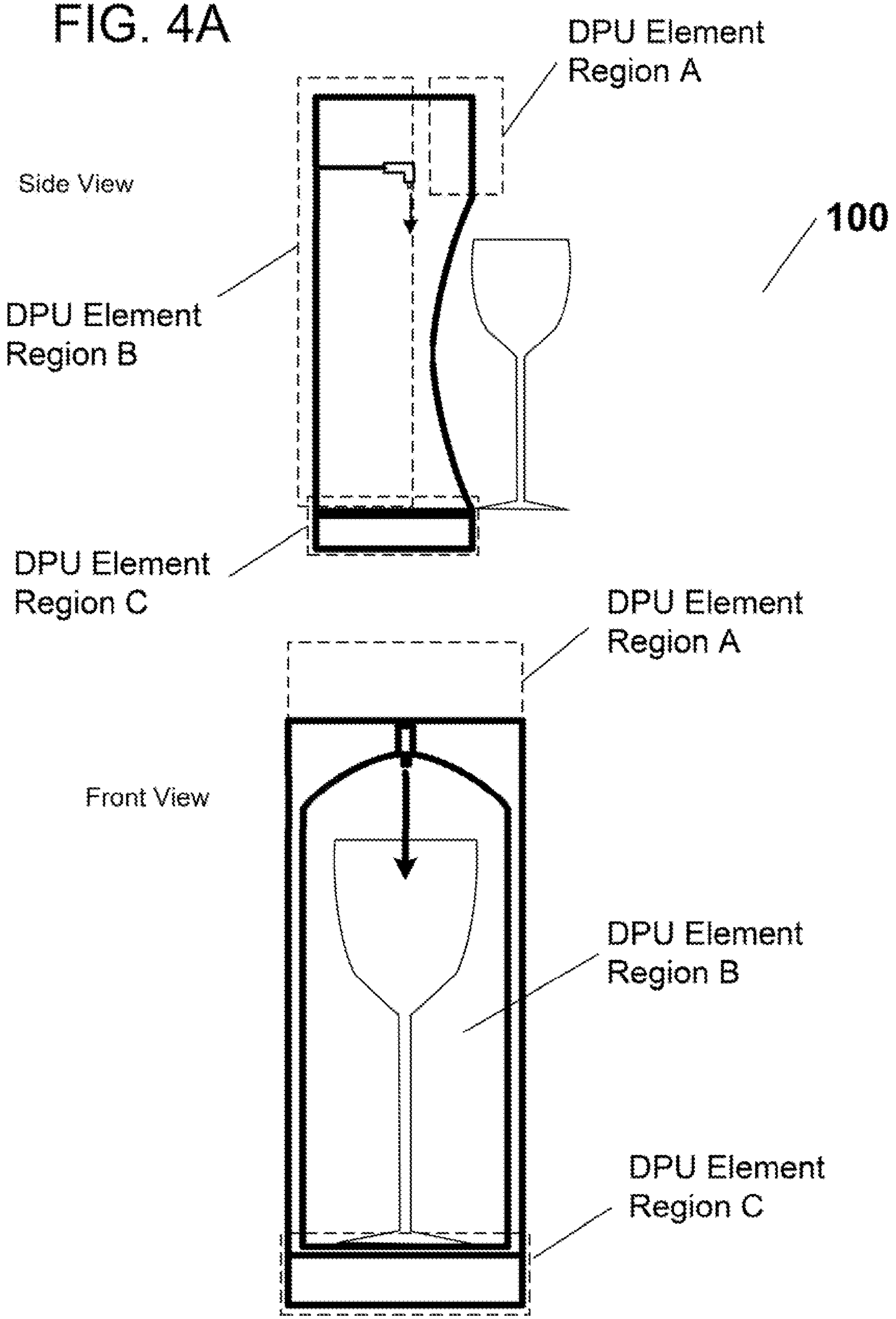
FIG. 4A is an illustrative diagram of an exemplary embodiment of a dispenser pour unit component that may be readily utilized as a subcomponent of the various novel systems of FIGS. 1-3C.
Figure 4B:
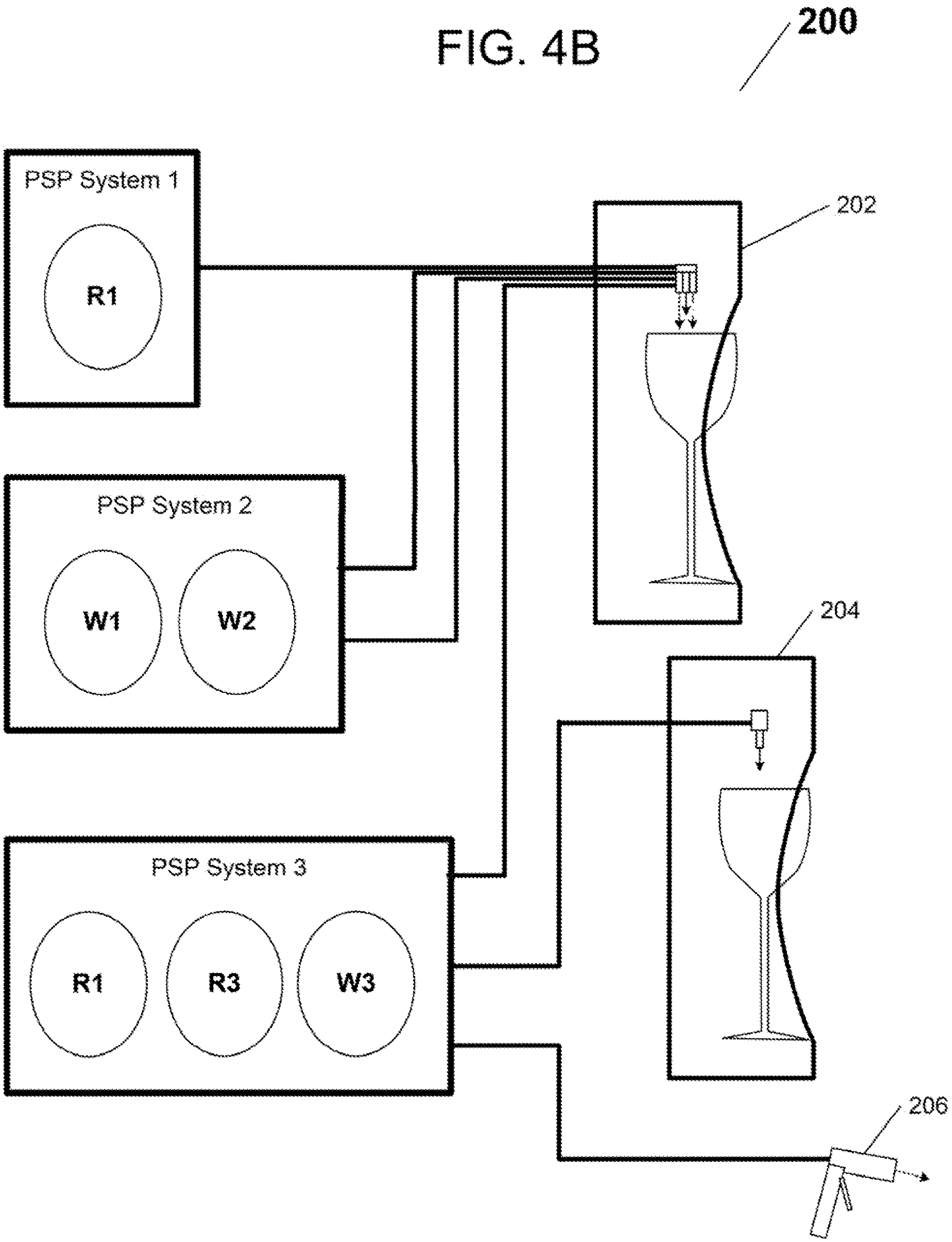
FIG. 4B is an illustrative diagram of an exemplary implementation of an arrangement of multiple dispenser pour unit components and multiple beverage sources that may be readily utilized in the inventive system of FIG. 1.
Figure 4C:
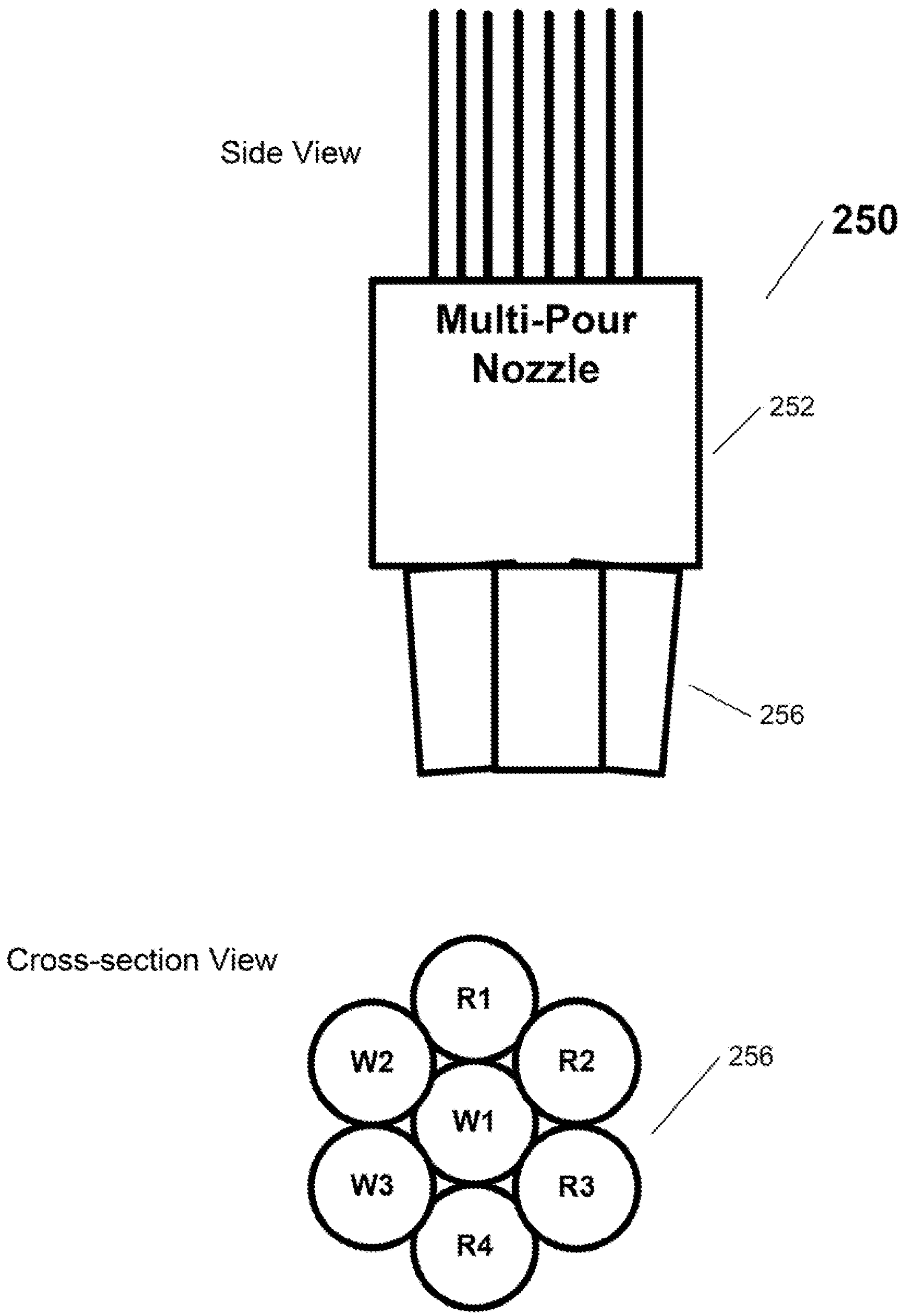
FIG. 4C is an illustrative diagram of an exemplary embodiment of a dispenser pour unit multi-pour nozzle element that may be readily utilized as a subcomponent in the various dispenser pour unit embodiments of FIGS. 1, 4A, and 4B.

Referring now to FIGS. 4A-4C, each of the various dispenser pour units that may be utilized in connection with the Wine Cannon SPMMPD system 1 of FIG. 1 (such as any of the dispenser pour components 4*a* to 4-2 of FIG. 1), may comprise any apparatus, device or system suitable for dispensing beverages (e.g., wine), preferably via rapid metered pours, into an appropriate container (e.g., a wine glass), when one of the dispensing functions of the Wine Cannon SPMMPD system 1 is activated. For example, a dispenser pour unit may be a simple spout, a gun-type hand-operable manual dispenser (such as a dispenser pour unit 206 shown in FIG. 4B), or it may comprise a vertically elongated housing comprising an opening sized and configured to receive a wine glass therein, such that the ovine glass can be positioned beneath a pour element to ensure that the dispensed liquid enters, and remains entirely within, the wine glass during the dispensing process (such as an exemplary dispenser pour unit 100 of FIG. 4A), Referring now to FIG. 4A, an exemplary embodiment of a dispenser pour component (such as any of the dispenser pour components 4*a* to 4-2 of FIG. 1) is shown, in multiple views, as a dispenser pour unit 100. The dispenser pour unit 100 can be readily configured to comprise a variety of advantageous features and functions, that may be located, disposed, and/or otherwise positioned, in whole or in part in one of several dispenser pour unit ("DPU") regions A to C (as shown, by way of example only, in FIG. 4A), and which may include, but which are not limited to, at least one or more of the following:

a. a flow sensor (e.g., a flow meter), or equivalent means of sensing the quantity of liquid that has been dispensed in each metered pour.

b. Pour/Dispense Activation i.e., the manner in which the dispensing of the wine is initiated)—may comprise one or more of the following:
   1. Manual Control: —may be activated by the user after a glass is positioned within the dispenser pour unit "dispensing bay", to cause the PSP system (that is connected to the dispenser pour unit) to rapidly dispense a predefined quantity of wine into the glass, which may include one or more of the following:
      i. push button, switch or equivalent manually operated control element,
      ii. voice-based interface (which may provide additional features such as the ability to select a specific wine to be poured in dispenser pour unit embodiments in which plural dispensing conduits are connected to a single dispenser pour unit)
      iii. remote control (having one or both of the above types of controls activated implemented as an electromechanical device, or as a software application (for example as an "App" in a mobile communication device)
   2. Automatic Control: —is automatically actuated when the dispenser pour unit detects that a wine glass is properly placed and aligned in the dispenser bay, enabling immediate dispensing of a predefined "pour amount" of the wine into the glass. The manner in which glass placement and positioning occurs may be selected as a matter of design choice, and may comprise:
      i. Mechanical sensor-pressure sensor, sensing switch (e.g., roller ball switch, motion trip switch, etc.), or
      ii. Non-mechanical sensor-IR, ultrasonic, light-based, motion sensor, etc., c. Available Pour Options identification-enabling identification for each dispenser pour unit, the corresponding "available to pour" wines and, when applicable, available options (e.g., blended pours, carbonation, etc.), pour size control (e.g., for optionally dispensing different volume pours, such as smaller volume "tasting" pours), and may comprise, at each dispenser pour unit, an electronic display (optionally supplied with a graphical user interface), physical labels (or replaceable printed info card(s), labeled buttons or other physical controls, or if the dispenser pour unit is operable to communicate therewith, via an App installed on a mobile device, etc.

d. Glass Positioning/Alignment—may comprise structural and/or mechanical guides in the bottom portion of the dispenser bay to physically assist in guiding the glass into a proper position within the dispenser bay to receive wine dispensed and/or may include visual cues to assist in glass positioning, such as illustrative and/or color indicators. Optionally, sensor and/or electronic feedback features may also be included such as an indicator light that turns on, and/or an audio tone that plays, when the glass is properly positioned. Additionally a splash protection element (such as a flexible (and optionally retractable flange or cover may be provided to limit or substantially eliminate the possibility of the dispensing process causing the dispensed beverage to splash out of the glass, e. Replaceable dispenser pour unit nozzles that may be utilized to enhance the wine being dispensed (such as an aeration nozzle), f. An optional light source operable to illuminate the target container H into which the liquid is being dispensed during the dispensing process, such that the cessation of the illumination serves as an indicator that the dispensation has been completed (the completion of the dispensing process may also/alternately be indicated by other means, such as by an audio signal).

g. Authentication of the user identity-biometrically (such as by a fingerprint sensor integrated into the pour control, or by facial or voice recognition, and/or by other ID verification means—e.g., an RFID card, etc.), where the user may be an authorized establishment employee, or a customer pre-enrolled with an account in the biometric system that is permitted to self-dispense from a biometric verification enabled dispenser pour unit.

h. A multi-pour nozzle, such as multi-pour nozzle 250 shown in FIG. 4C, comprising a single nozzle "head" 252 comprising a bundle of multiple nozzle elements 256 disposed therein, to enable the dispenser pour unit 100 to dispense different beverages (for example, multiple wines selected from four different red wines R1 to R4, and three different white wines W1 to W3) from multiple corresponding beverage sources (each beverage source comprising a dispenser conduit, connected to a corresponding nozzle element in the bundle 256, and to a corresponding PSP system source, which, may comprise one of:

1. A multi-beverage single PSP system source (s) (e.g., different individual wine bags stored in the same PSP system pressurized canister), such as PSP systems 2 and 3 shown in a multi-source dispensing arrangement 200 of FIG. 4B,
2. Multiple plural PSP system beverage sources (e.g., different individual wine bags each stored in a different PSP system pressurized canister), such as PSP system 1 (and similar additional PSP systems (not shown) of FIG. 4B, and
3. Any combination of a multi-beverage single PSP system source(s), and multiple plural PSP system beverage sources, such as PSP systems 1, 2 and 3 of the multi-source dispensing arrangement 200 of FIG. 46.

A multi-pour nozzle 250 may comprise any reasonable number of nozzle elements ranging from 2 to 9 (or more), determined as a matter of design choice, without departing from the spirit of the invention.

i. Any dispenser pour unit that comprises a multipour nozzle (such as the multi-pour nozzle 250) may be equipped with "Blended Pour" functionality, enabling a wide range of wines to be blended during the dispensing process, each blended pour being configured in accordance with at least the following parameters (collectively comprising a corresponding "Blended Pour Profile"): (1) selection of number and types of wine to be blended, and (2) selection of pour volume of each wine to be blended, 1. The blended pour functionality is preferably implemented in dispenser pour units equipped with a multi-pour nozzle (see above). During blended pour operation, multiple selected nozzle elements are activated substantially simultaneously (preferably to dispense each wine to be blended in accordance with a selected predetermined Blended Pour Profile), to enable beverage blends (such as wine varietal blends) to be instantaneously produced in the glass positioned in the dispenser bay of the dispenser pour unit.
2. Blended Pour Profiles can be changed periodically (e.g., nightly) by the operating establishment, to reflect beverage menu items and/or specials, Blended Pour Profiles may also be custom configured by an authorized operator of a dispenser pour unit on a case by case basis, and/or by an end user (e.g., a customer), for example through a BMS sys interface (e.g., 7, 7-1, 7-2) supplied by the operating establishment, or via an App installed on the customer's mobile data processing device (that may connect to the BMS control system 6), which may also provide Blended Pour Profile suggestions based on framed Bordeaux or other appellations, on various vintages and specific wines.

Thus, while there have been shown and described and pointed out fundamental novel features of the inventive system and method as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

The invention claimed is:

1. A system for selectively managing dispensing of a portion of a liquid volume stored in a pressurized environment, the system comprising:

an incompressible, pressurized container including a hollow housing portion and an outer portion, the pressurized container being airtight and operable to maintain a pressure level in an internal pressurized environment in the hollow housing portion, the pressurized container including a portal to allow access to the hollow housing portion and enabling a first compressible container to be stored within the hollow housing portion;

a dispensing system including a plurality of liquid transport conduits, the plurality of liquid transport conduits including a first liquid transport conduit the first liquid transport conduit extending from the outer portion through a pressurized container interface to the hollow housing portion of the pressurized container, the pressurized container interface capable of maintaining the pressure level in the internal pressurized environment in the hollow housing portion, an end of the first liquid transport conduit within the hollow housing portion of the pressurized container including a releasable connection capable of releasably creating a sealed connection to the compressible container, another end of the first liquid transport conduit being outside the outer portion of the pressured container and being coupled to a dispenser, the first liquid transport conduit including a valve to enable or disable a flow of the liquid volume, the liquid volume comprises an alcoholic beverage, the alcoholic beverage comprises a wine;

a carbonation component coupled to the first liquid transport conduit and configured to selectively add carbonation to the flow of the liquid volume, the carbonation component being operable to add the carbonation to the liquid volume in accordance to a blending profile;

a pressure regulation system connected to the pressurized container, the pressure regulation system including at least one pressure conduit extending from the outer portion through a pressure interface and into the hollow housing portion of the pressurized container, the pressure regulation system operable to exert and maintain the pressure level within the pressurized container to enable compression of the first compressible container in the internalized pressurized environment; and a control system operable to selectively open and close the valve.

2. The system of claim 1, wherein the carbonation is added by coupling a carbonation source to the dispensing system by a remotely controllable valve.

3. The system of claim 1, the control system further operable to selectively add the carbonation to the first liquid transport conduit.

4. A system for selectively managing dispensing of a portion of a liquid volume stored in a pressurized environment, the system comprising:

an incompressible, pressurized container including a hollow housing portion and an outer portion, the pressurized container being airtight and operable to maintain a pressure level in an internal pressurized environment in the hollow housing portion, the pressurized container including a portal to allow access to the hollow housing portion and enabling a first compressible container to be stored within the hollow housing portion;

a dispensing system including a plurality of liquid transport conduits and a multi-pour nozzle, the plurality of liquid transport conduits including a first liquid transport conduit, the first liquid transport conduit extending from the outer portion through a pressurized container interface to the hollow housing portion of the pressurized container, the pressurized container interface capable of maintaining the pressure level in the internal pressurized environment in the hollow housing portion, an end of the first liquid transport conduit within the hollow housing portion of the pressurized container including a releasable connection capable of releasably creating a sealed connection to the compressible container, another end of the first liquid transport conduit being outside the outer portion of the pressured container and being coupled to a dispenser, the first liquid transport conduit including a valve to enable or disable a flow of the liquid volume, the multi-pour nozzle comprising a plurality of nozzle elements, each of the plurality of nozzle elements capable of being connected to a different liquid transport conduit, each of the different liquid transport conduits being capable of being coupled to a different compressible container by a different releasable connection;

a carbonation component coupled to the first liquid transport conduit and configured to selectively add carbonation to the flow of the liquid volume;

a pressure regulation system connected to the pressurized container, the pressure regulation system including at least one pressure conduit extending from the outer portion through a pressure interface and into the hollow housing portion of the pressurized container, the pressure regulation system operable to exert and maintain the pressure level within the pressurized container to enable compression of the first compressible container in the internalized pressurized environment; and a control system operable to selectively open and close the valve.

5. The system of claim 4, wherein the multi-pour nozzle is configured to be equipped with a blend pour functionality, enabling pressurized liquid from two or more dispensing conduits to be dispensed in a blended pour.

6. The system of claim 5, wherein the multi-pour nozzle comprises 2 to 9 nozzle elements.

7. The system of claim 6, wherein the control system is remotely operable to selectively activate simultaneously two or more nozzle elements to enable the blend pour functionality.

8. A system for selectively managing dispensing of a portion of a liquid volume stored in a pressurized environment, the system comprising:

an incompressible, pressurized container including a hollow housing portion and an outer portion, the pressurized container being airtight and operable to maintain a pressure level in an internal pressurized environment in the hollow housing portion, the pressurized container including a portal to allow access to the hollow housing portion and enabling a first compressible container to be stored within the hollow housing portion;

a dispensing system including a plurality of liquid transport conduits, the plurality of liquid transport conduits including a first liquid transport conduit, the first liquid transport conduit extending from the outer portion through a pressurized container interface to the hollow housing portion of the pressurized container, the pressurized container interface capable of maintaining the pressure level in the internal pressurized environment in the hollow housing portion, an end of the first liquid transport conduit within the hollow housing portion of the pressurized container including a releasable connection capable of releasably creating a sealed connection to the compressible container, another end of the first liquid transport conduit being outside the outer portion of the pressured container and being coupled to a dispenser, the first liquid transport conduit including a valve to enable or disable a flow of the liquid volume;

a carbonation component coupled to the first liquid transport conduit and configured to selectively add carbonation to the flow of the liquid volume;

a pressure regulation system connected to the pressurized container, the pressure regulation system including at least one pressure conduit extending from the outer portion through a pressure interface and into the hollow housing portion of the pressurized container, the pressure regulation system operable to exert and maintain the pressure level within the pressurized container to enable compression of the first compressible container in the internalized pressurized environment; and a control system operable to selectively open and close the valve, the control system being remotely operable to control the pressure regulation system to exert the pressure level in the internal pressurized environment to enable compression of the compressible pressurized container in the internal pressurized environment.

9. The system of claim 1, wherein the valve is a solenoid valve.

10. The system of claim 9, wherein the solenoid valve is coupled to a wall of the hollow housing portion.

11. A method comprising:

receiving a first signal from a control signal to open a first valve of an incompressible, pressurized container, the pressurized container including a hollow housing portion and an outer portion, the pressurized container being airtight and operable to maintain a pressure level in an internal pressurized environment in the hollow housing portion, the pressurized container including a portal to allow access to the hollow housing portion and enabling a first compressible container to be stored within the hollow housing portion;

in response to the first signal to open the first valve, opening a first valve of a first liquid transport conduit of a plurality of liquid transport conduits to enable or disable a flow of a liquid volume from the first compressible container, the first liquid transport conduit extending from the outer portion through a pressurized container interface to the hollow housing portion of the pressurized container, the pressurized container interface capable of maintaining the pressure level in the internal pressurized environment in the hollow housing portion, an end of the first liquid transport conduit within the hollow housing portion of the pressurized container including a releasable connection capable of releasably creating a sealed connection to the compressible container, another end of the first liquid transport conduit being outside the outer portion of the pressured container and being coupled to a dispenser, at least one pressure conduit extending from the outer portion through a pressure interface and into the hollow housing portion of the pressurized container, a pressure regulation system operable to exert and maintain the pressure level within the pressurized container to enable compression of the first compressible container in the internalized pressurized environment, the dispenser including a multi-pour nozzle, the multi-pour nozzle comprising a plurality of nozzle elements, each of the plurality of nozzle elements capable of being connected to a different liquid transport conduit, each of the different liquid transport conduits being capable of being coupled to a different compressible container by a different releasable connection; and adding carbonation to the at least one liquid transport conduit by a carbonation component, the carbonation component configured to selectively add carbonation to the flow of the liquid volume.

12. The method of claim 11, wherein the carbonation is added by coupling a carbonation source to the dispensing system by a remotely controllable valve.

13. The method of claim 11, wherein adding the carbonation to the at least one liquid transport conduit comprises receiving a second signal from the control system to selectively add carbonation to the at least one liquid transport conduit and opening a second valve to allow gas to be added to the at least one liquid transport conduit.

14. The method of claim 11, wherein the pressurized liquid comprises an alcoholic beverage.

15. The method of claim 14 wherein the alcoholic beverage comprises a wine, and the carbonation component is operable to add the carbonation to the pressurized liquid in accordance to a blending profile.

16. The method of claim 11, wherein the control system is remotely operable to control the pressure regulation system to exert the pressure level in the internal pressurized environment to enable compression of the compressible pressurized container in the internal pressurized environment.

17. The method of claim 11, wherein the first valve is a solenoid valve.

18. The method of claim 17, wherein the solenoid valve is coupled to a wall of the hollow housing portion.

* * * * *